United States Patent [19]
Downey et al.

[11] Patent Number: 5,553,081
[45] Date of Patent: Sep. 3, 1996

[54] APPARATUS AND METHOD FOR DETECTING A SIGNAL IN A COMMUNICATIONS SYSTEM

[75] Inventors: Walter J. Downey, Los Gatos; Philip H. Sutterlin, San Jose; Amy O. Hurlbut, San Francisco; J. Marcus Stewart, San Jose; Benjamin W. Chui, Sunnyvale; Robert A. Dolin, Jr., Menlo Park, all of Calif.

[73] Assignee: Echelon Corporation, Palo Alto, Calif.

[21] Appl. No.: 224,903

[22] Filed: Apr. 8, 1994

[51] Int. Cl.$^6$ .............................. H04M 11/04; H04J 3/02
[52] U.S. Cl. .............. 371/6; 329/304; 332/103; 370/85.2; 375/200; 375/219; 375/279; 375/329; 340/310.01; 340/310.02; 340/310.03; 364/514 R
[58] Field of Search ..................... 371/6; 375/1, 7, 375/37, 39, 10, 219, 279, 329; 329/304; 332/103; 370/20, 85.2, 85.3, 85.4; 340/310.01, 310.02, 310.03; 455/3.3; 364/514 R

[56] References Cited

U.S. PATENT DOCUMENTS

| | | | |
|---|---|---|---|
| 4,311,964 | 1/1982 | Boykin | 329/104 |
| 4,517,670 | 5/1985 | Ulvg | 370/85 |
| 4,697,166 | 9/1987 | Warnagiris et al. | 340/310 R |
| 4,745,391 | 5/1988 | Gajjar | 340/310 A |
| 4,804,938 | 2/1989 | Rouse et al. | 340/310 A |
| 4,807,224 | 2/1989 | Naron et al. | 370/94 |
| 4,809,296 | 2/1989 | Braun et al. | 375/1 |
| 4,815,106 | 3/1989 | Propp et al. | 375/36 |
| 4,864,589 | 9/1989 | Endo | 375/1 |
| 4,918,690 | 4/1990 | Markkula, Jr. et al. | 370/94 |
| 4,922,506 | 5/1990 | McCallister et al. | 375/1 |
| 4,962,496 | 10/1990 | Vercellotti et al. | 370/11 |
| 4,973,940 | 11/1990 | Sakai et al. | 340/310 R |
| 4,988,972 | 1/1991 | Takagi | 340/310 |
| 5,021,753 | 6/1991 | Chapman | 332/103 |
| 5,090,024 | 2/1992 | Vander Mey et al. | 375/1 |
| 5,113,410 | 5/1992 | Hamano et al. | 375/7 |
| 5,146,471 | 9/1992 | Cowart | 375/1 |
| 5,148,144 | 9/1992 | Sutterlin et al. | 340/310 A |
| 5,159,710 | 10/1992 | Cusdin | 455/304 |
| 5,168,510 | 12/1992 | Hill | 375/40 |
| 5,182,746 | 1/1993 | Hurlbut et al. | 370/100.1 |

(List continued on next page.)

OTHER PUBLICATIONS

Onunga et al., "Personal Computer Comm. on Intrabuilding Power Line LAN's Using CSMA with Priority Acknowledgements", 1989.

Onunga et al., "Performance of CSMA with Priority Acknowledgements on Intrabuilding Power Line LANs", 1988.

Onunga et al., "A Simple Packet Retransmission Strategy for throughput and delay enhancement on Power line Comm. channels", 1992.

Minoli, *1st, 2nd & Next Generation LANs*, pp. 253–269, Sep./1993.

(List continued on next page.)

*Primary Examiner*—Emanuel T. Voeltz
*Assistant Examiner*—Patrick J. Assouad
*Attorney, Agent, or Firm*—Blakely, Sokoloff, Taylor & Zafman

[57] ABSTRACT

In a communications system, an apparatus and method for detecting a valid signal from noise. An adaptive threshold is used to qualify a received signal. The adaptive threshold is set according to the number of false detects occurring within a given time interval. The number of false detects is initially determined by a quick qualification process. This initial number is subsequently adjusted by a more accurate qualification process. The transmitted signal is modulated with a particular pattern. Upon receiving the signal, it is demodulated to retrieve that pattern. The demodulated pattern is correlated against multiple reference patterns and combined to provide a measure of peak correlation that is independent of pattern phase. Furthermore, a tone detector is used to distinguish valid signals from interfering tones. Two different types of detection methods are performed in parallel. One is based on the energy of the received signal, whereas the other is based on the correlation of the received signal.

65 Claims, 23 Drawing Sheets

U.S. PATENT DOCUMENTS

| | | | |
|---|---|---|---|
| 5,210,518 | 5/1993 | Graham et al. | 340/310 R |
| 5,210,519 | 5/1993 | Moore | 340/310 R |
| 5,239,496 | 8/1993 | Vancraeynest | 364/728.03 |
| 5,257,006 | 10/1993 | Graham et al. | 340/310 A |
| 5,260,974 | 11/1993 | Johnson et al. | 375/76 |
| 5,262,755 | 11/1993 | Mak et al. | 340/310 |
| 5,263,050 | 11/1993 | Sutterlin et al. | 375/1 |
| 5,268,647 | 12/1993 | Ichiyoshi | 329/308 |
| 5,278,862 | 1/1994 | Vander Mey | 375/1 |
| 5,280,538 | 1/1994 | Kataoka et al. | 375/1 |
| 5,289,476 | 2/1994 | Johnson et al. | 371/37.1 |
| 5,289,498 | 2/1994 | Hurlbut et al. | 375/1 |
| 5,295,162 | 3/1994 | Zarembowitch | 375/83 |
| 5,339,313 | 8/1994 | Ben-Michael et al. | 370/85.13 |
| 5,349,644 | 9/1994 | Massey et al. | 395/200 |
| 5,353,302 | 10/1994 | Bi | 375/1 |
| 5,357,541 | 10/1994 | Cowart | 375/1 |
| 5,363,414 | 11/1994 | Muto | 375/94 |
| 5,404,127 | 4/1995 | Lee et al. | 340/310.02 |
| 5,406,249 | 4/1995 | Pettus | 340/310.06 |
| 5,434,847 | 7/1995 | Kou | 370/17 |
| 5,434,893 | 7/1995 | Le Roy et al. | 375/208 |

OTHER PUBLICATIONS

Silberschatz et al., *Operating System Concepts*, pp. 496–497, 1994.

*IEEE Transactions on Communications*, Jan. 1976, pp. 106–112. "A Class of Soft Decision Error Detectors for the Gaussian Channel".

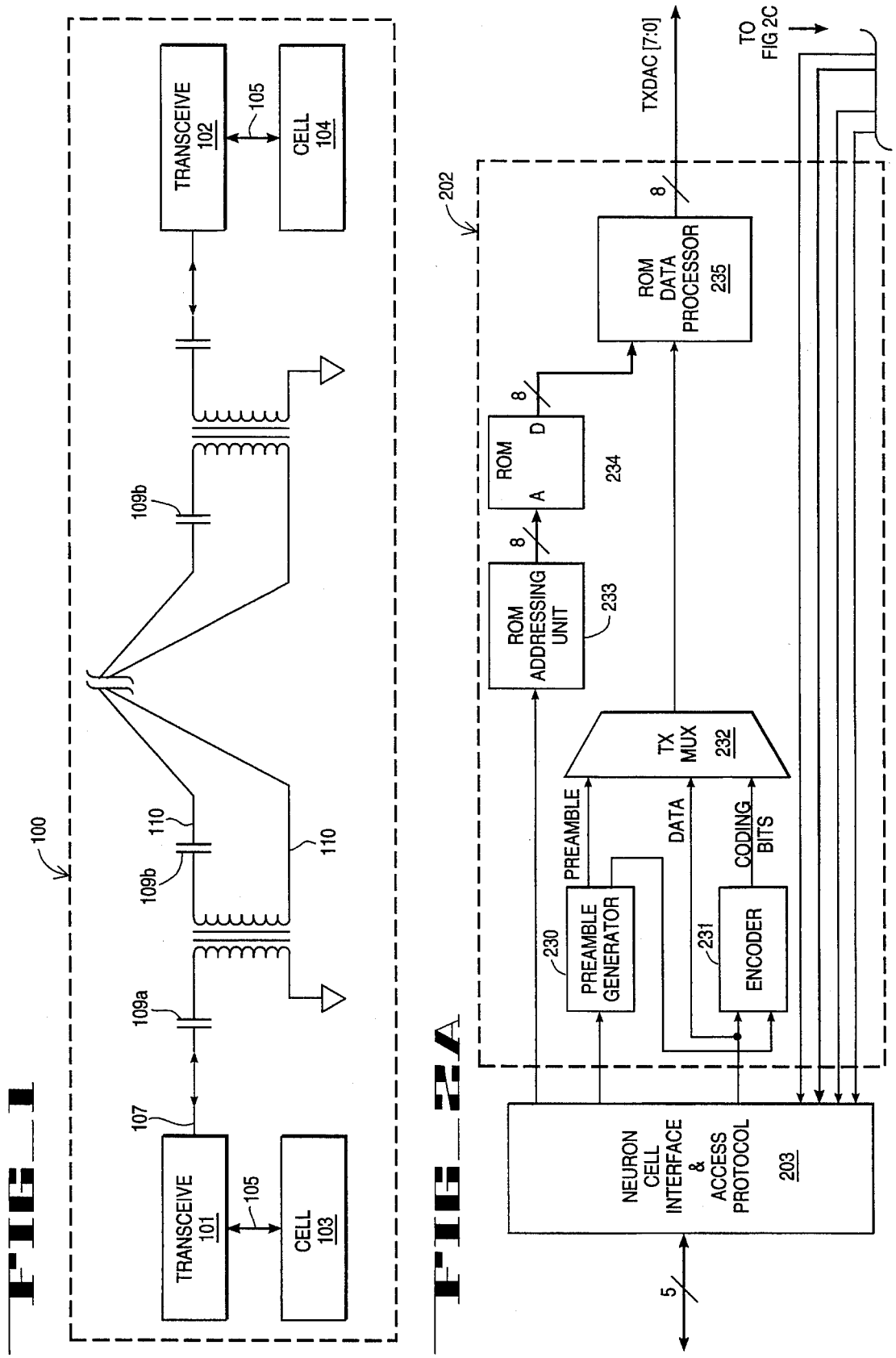

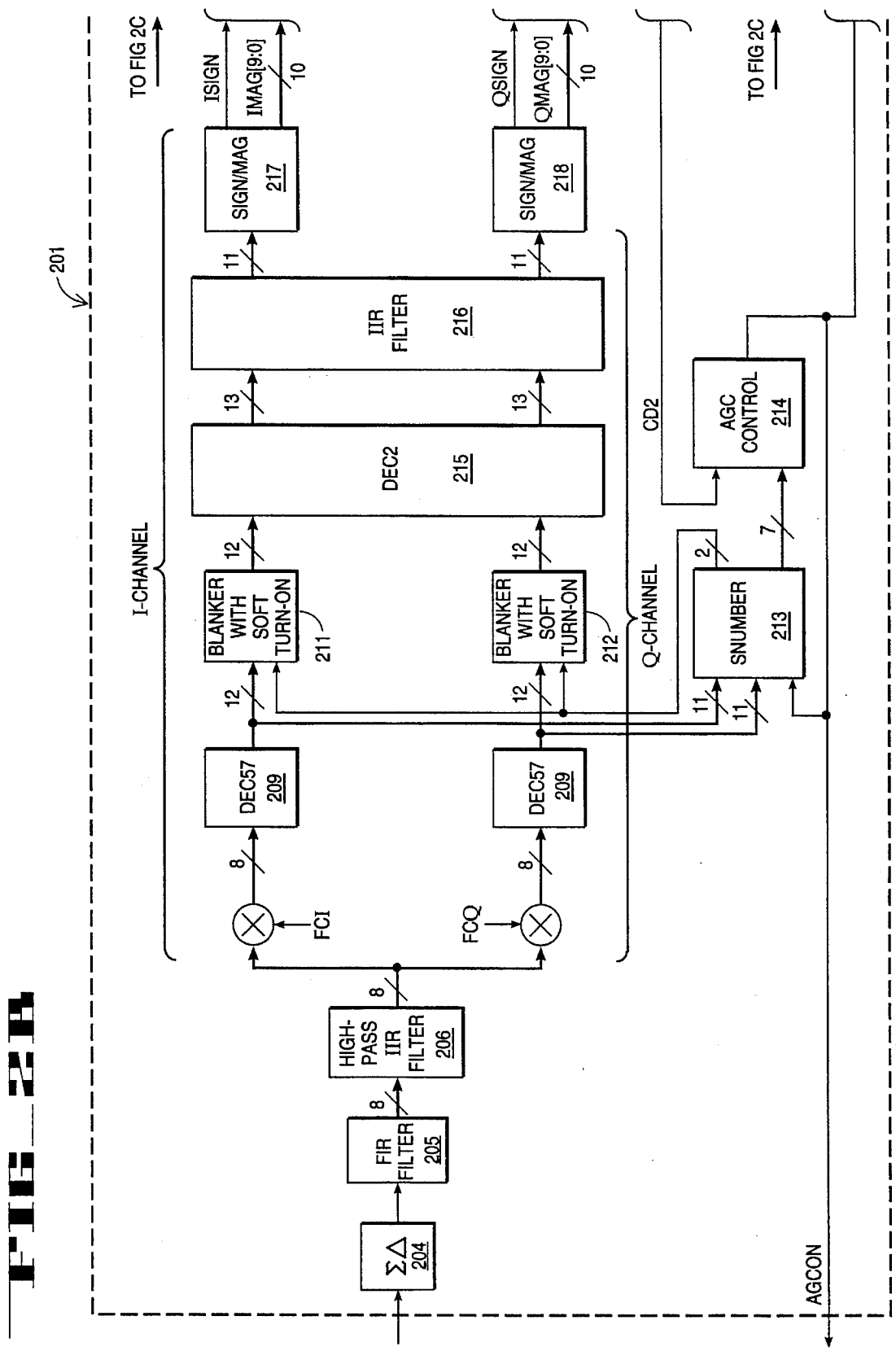

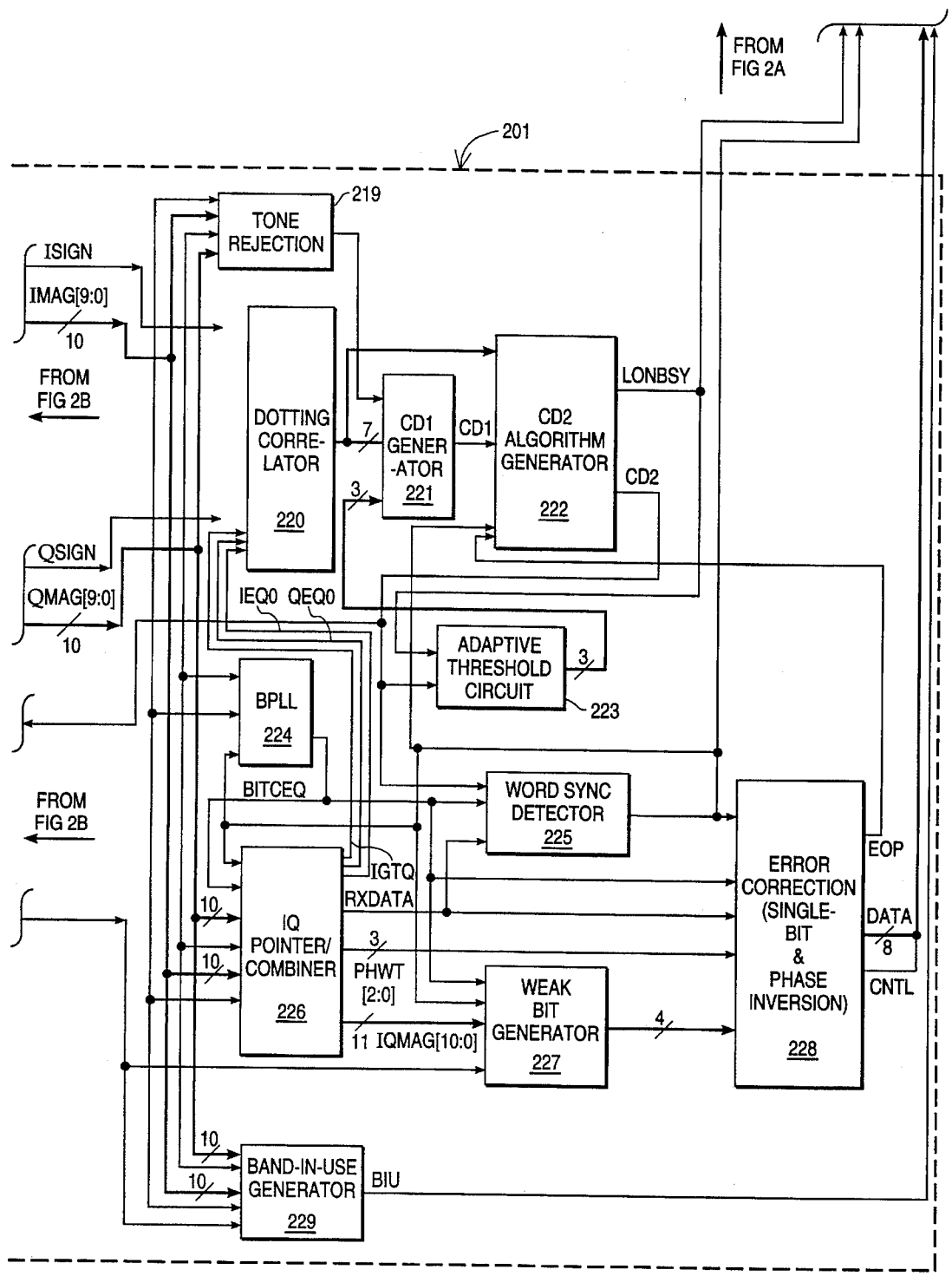

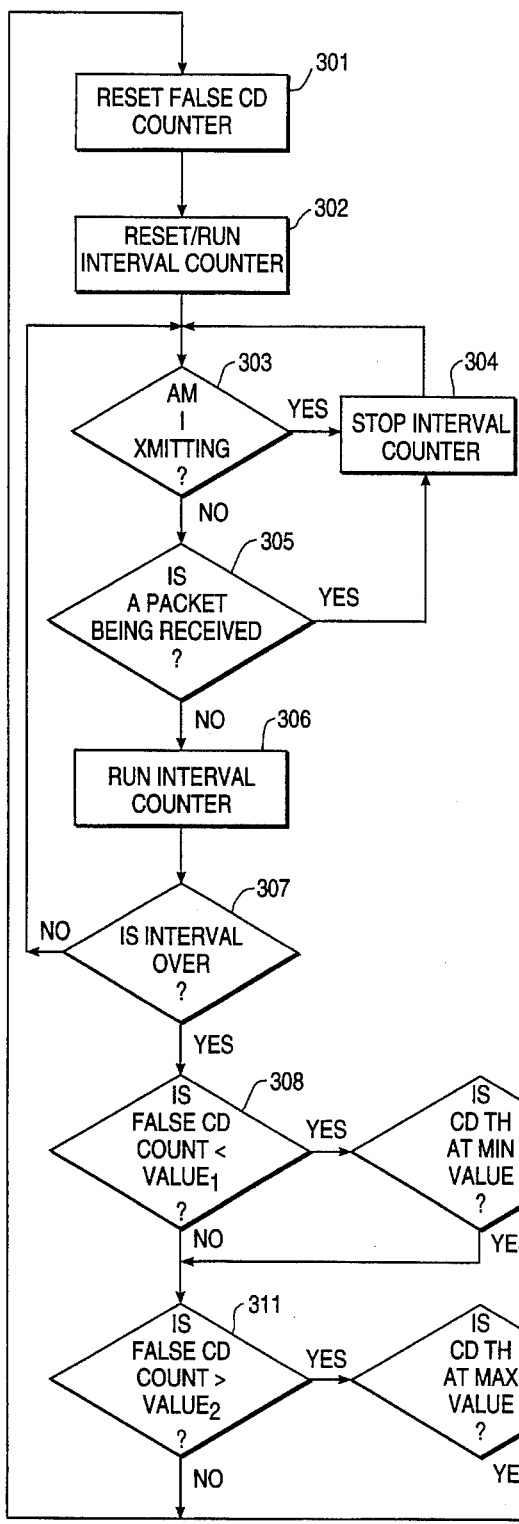
FIG_3
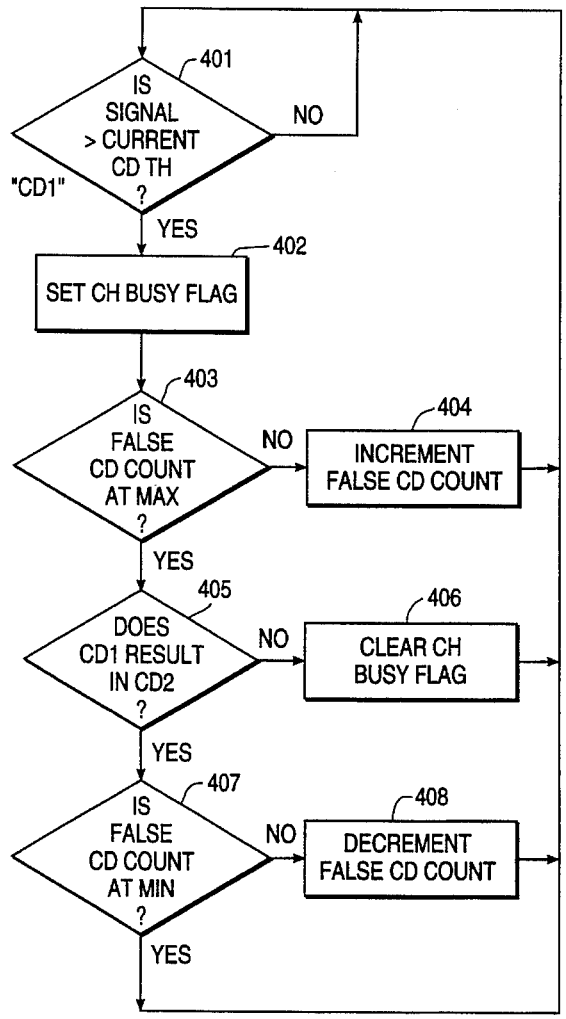
FIG_4

FIG_5
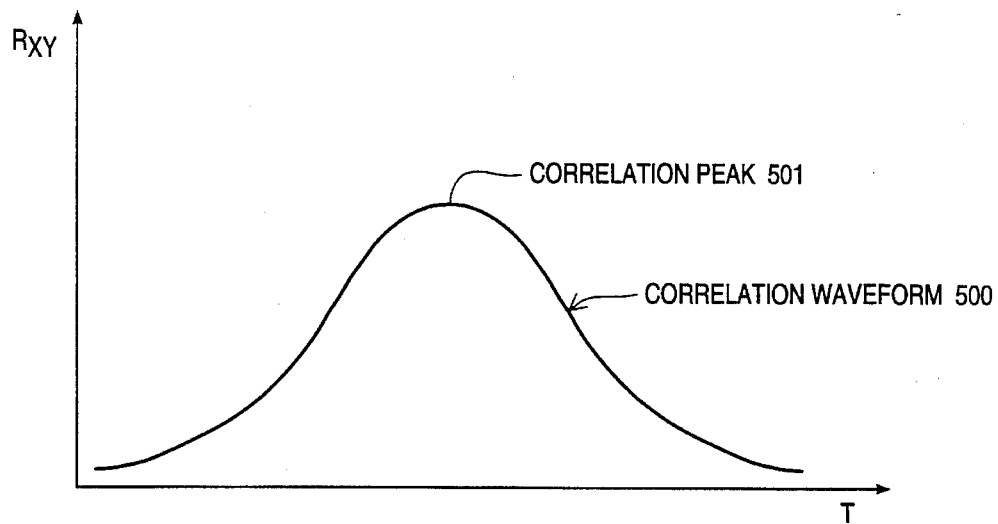
FIG_7A
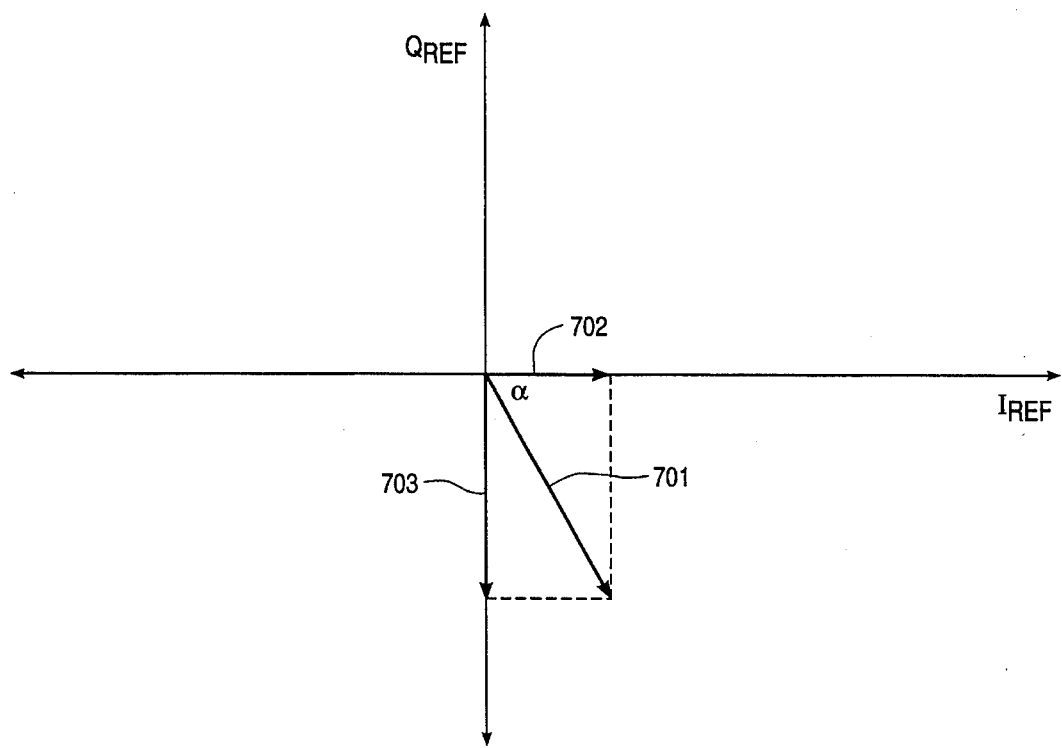

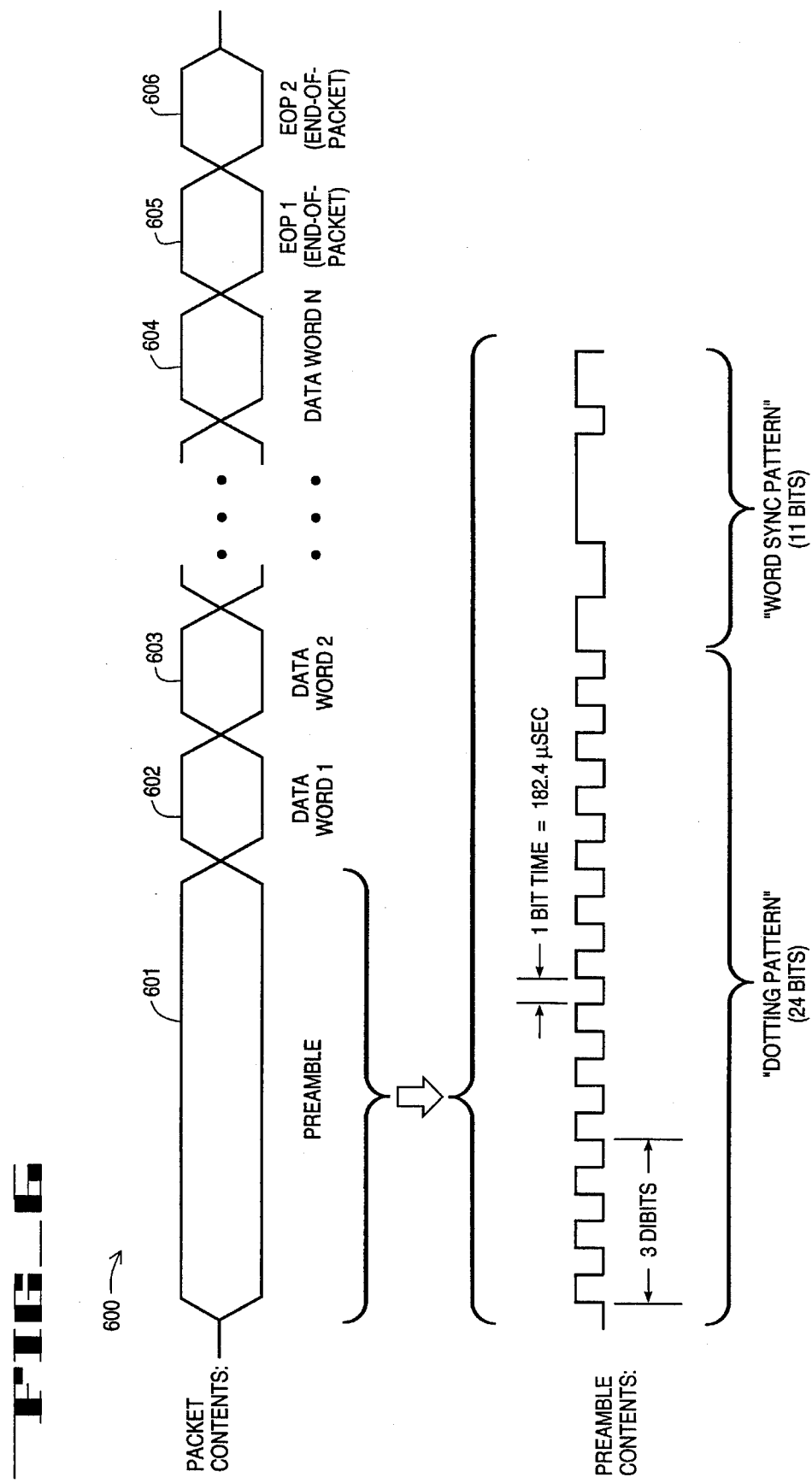

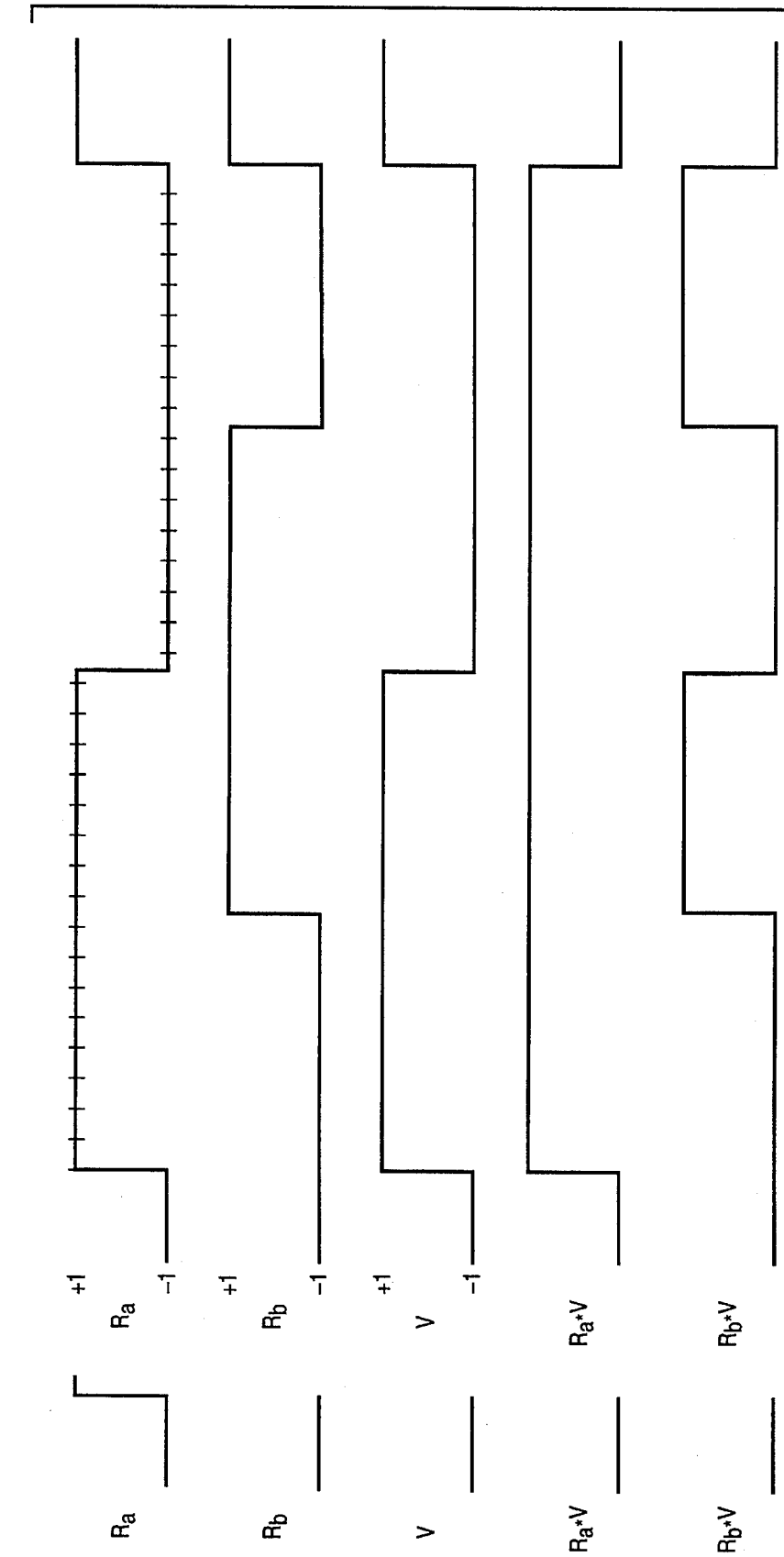

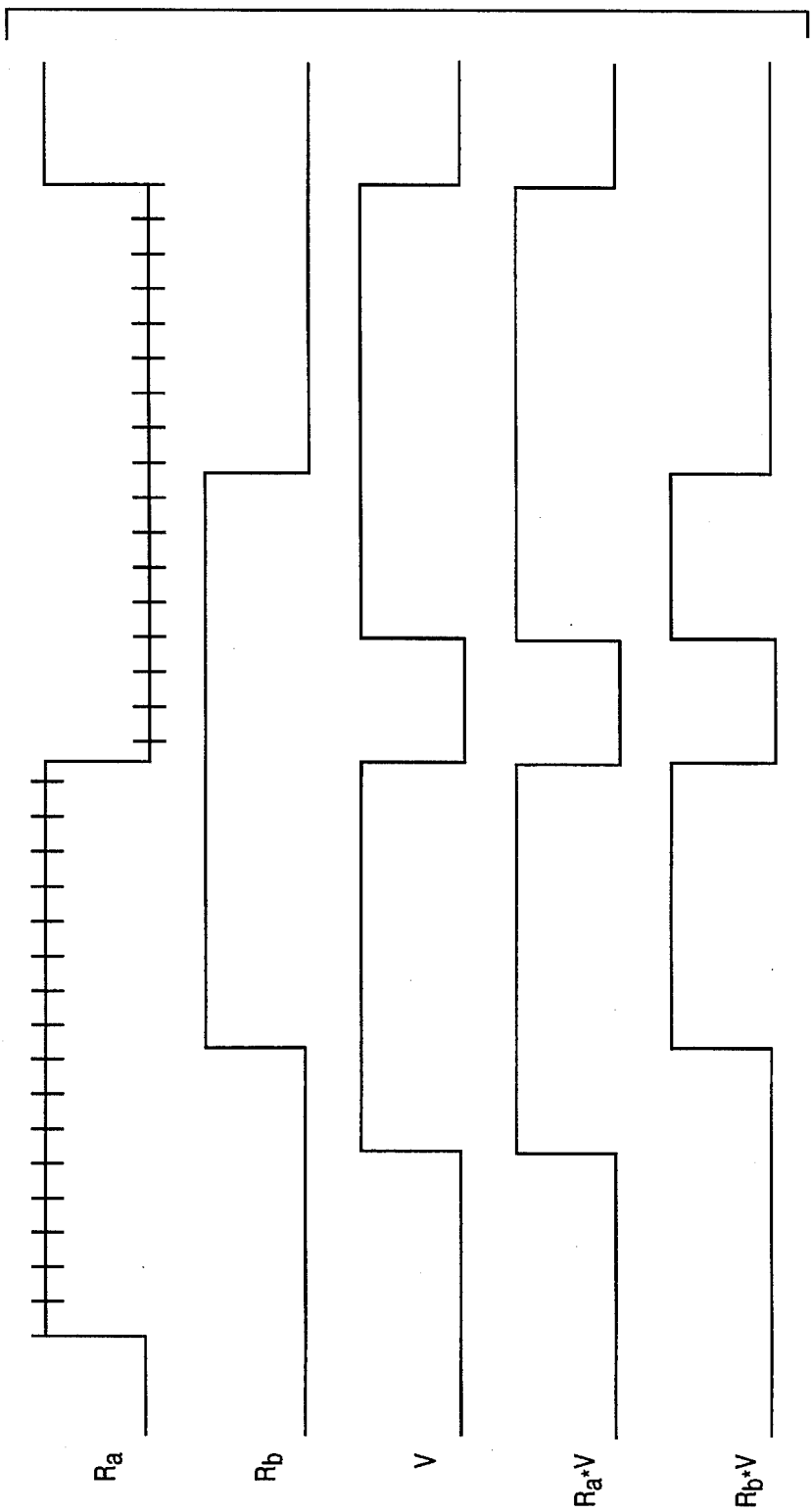

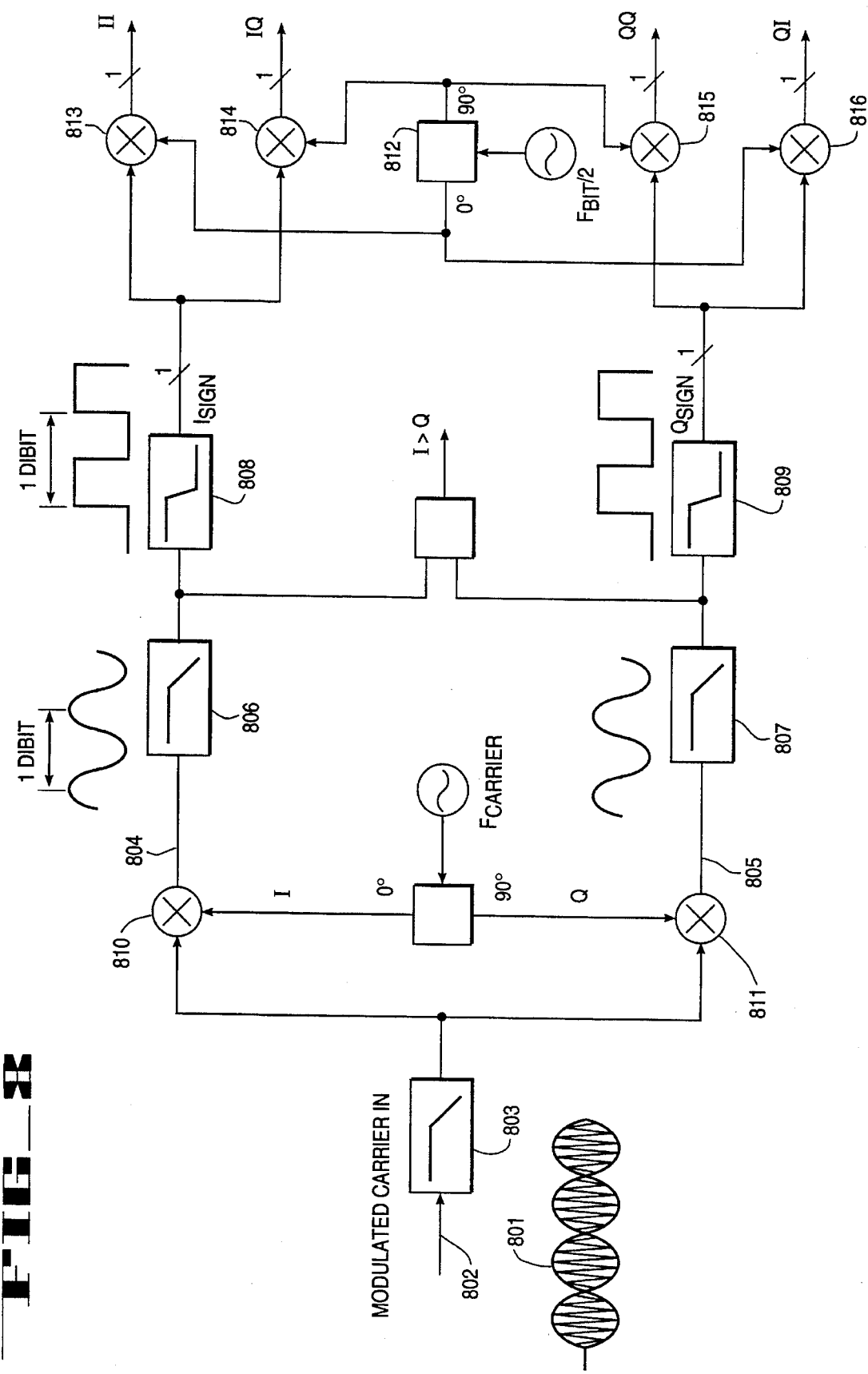
FIG_9

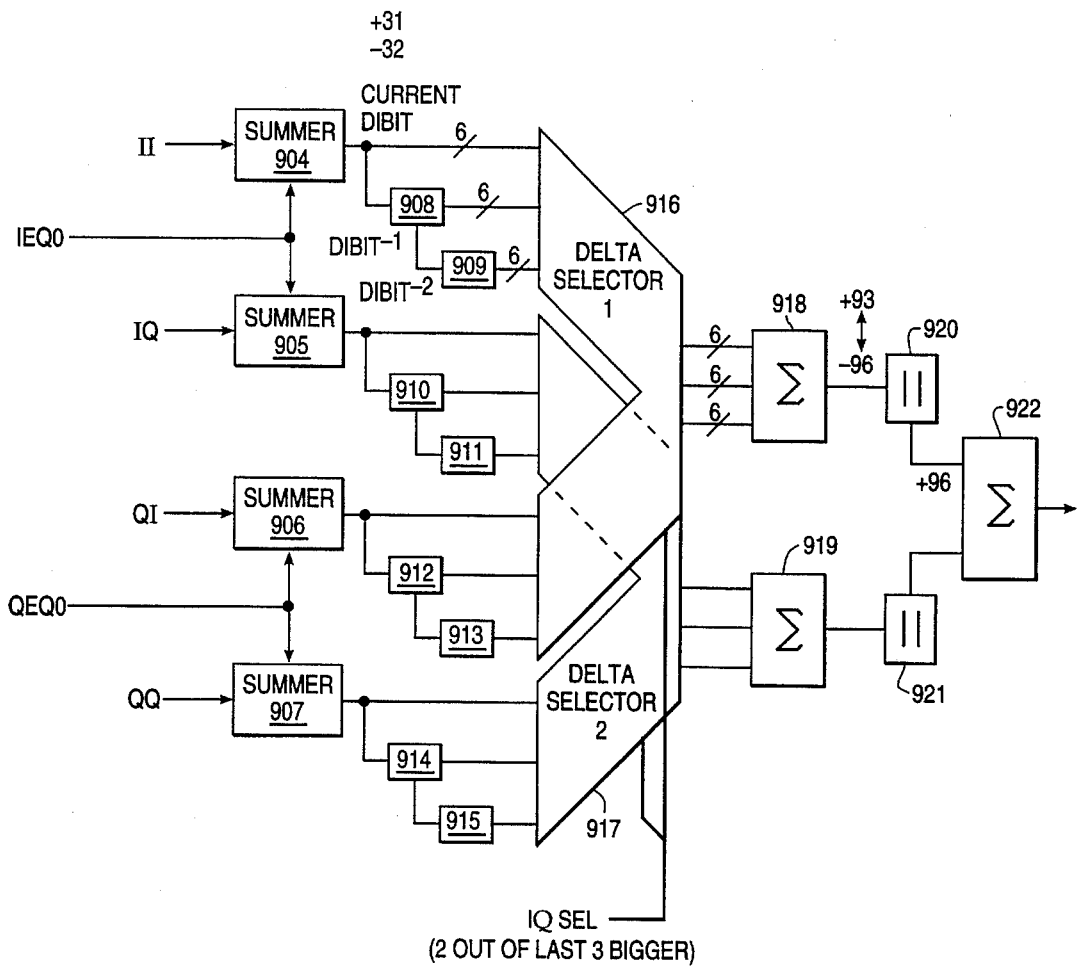
FIG_9
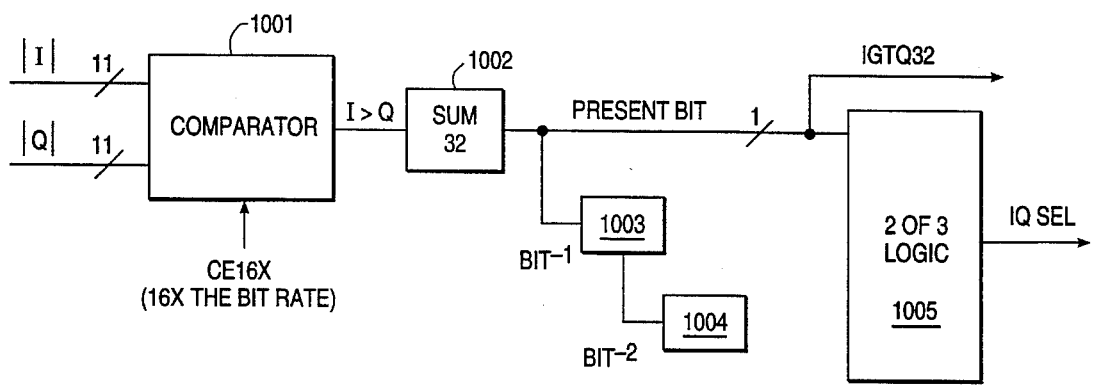
FIG_10

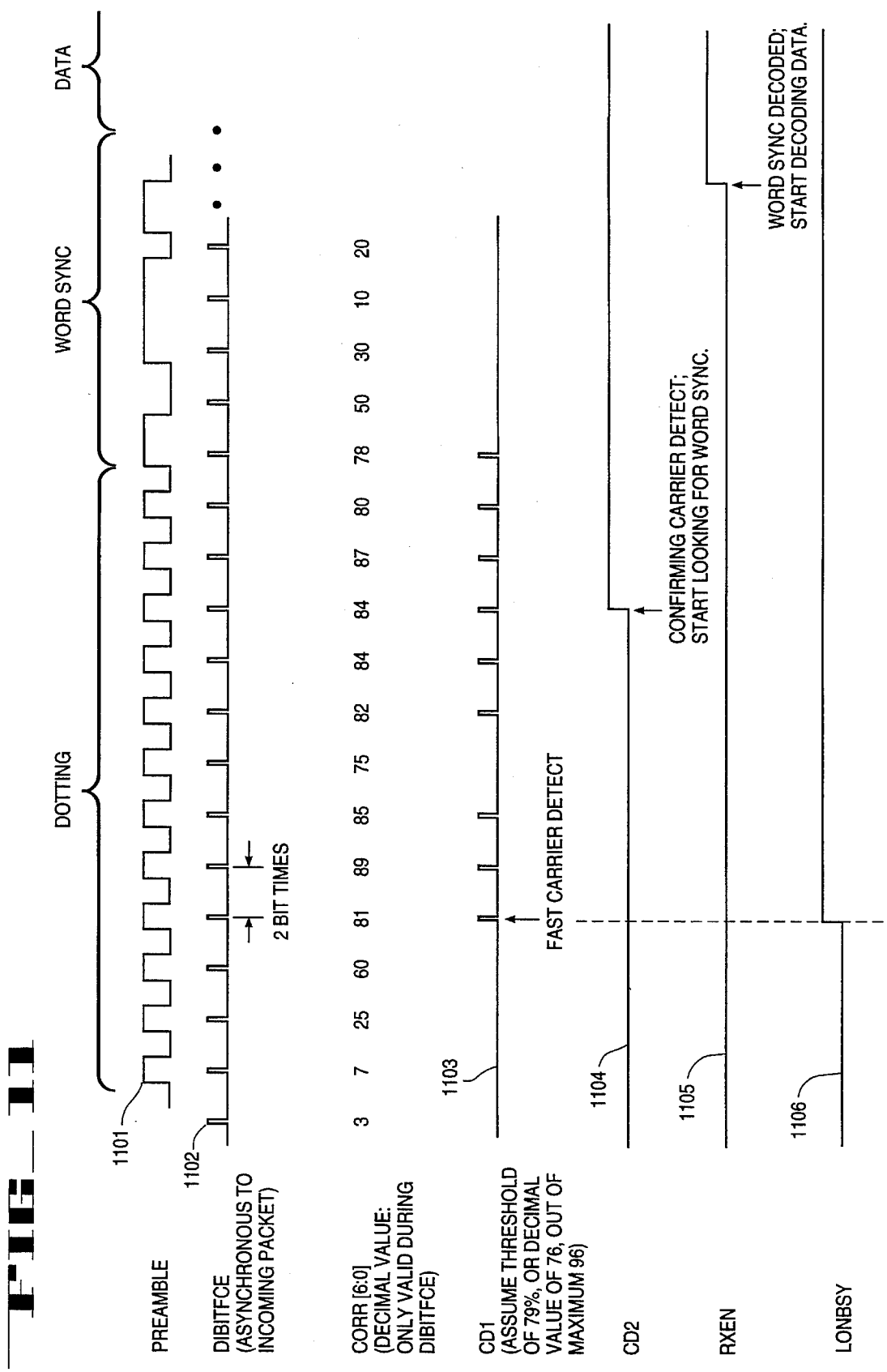

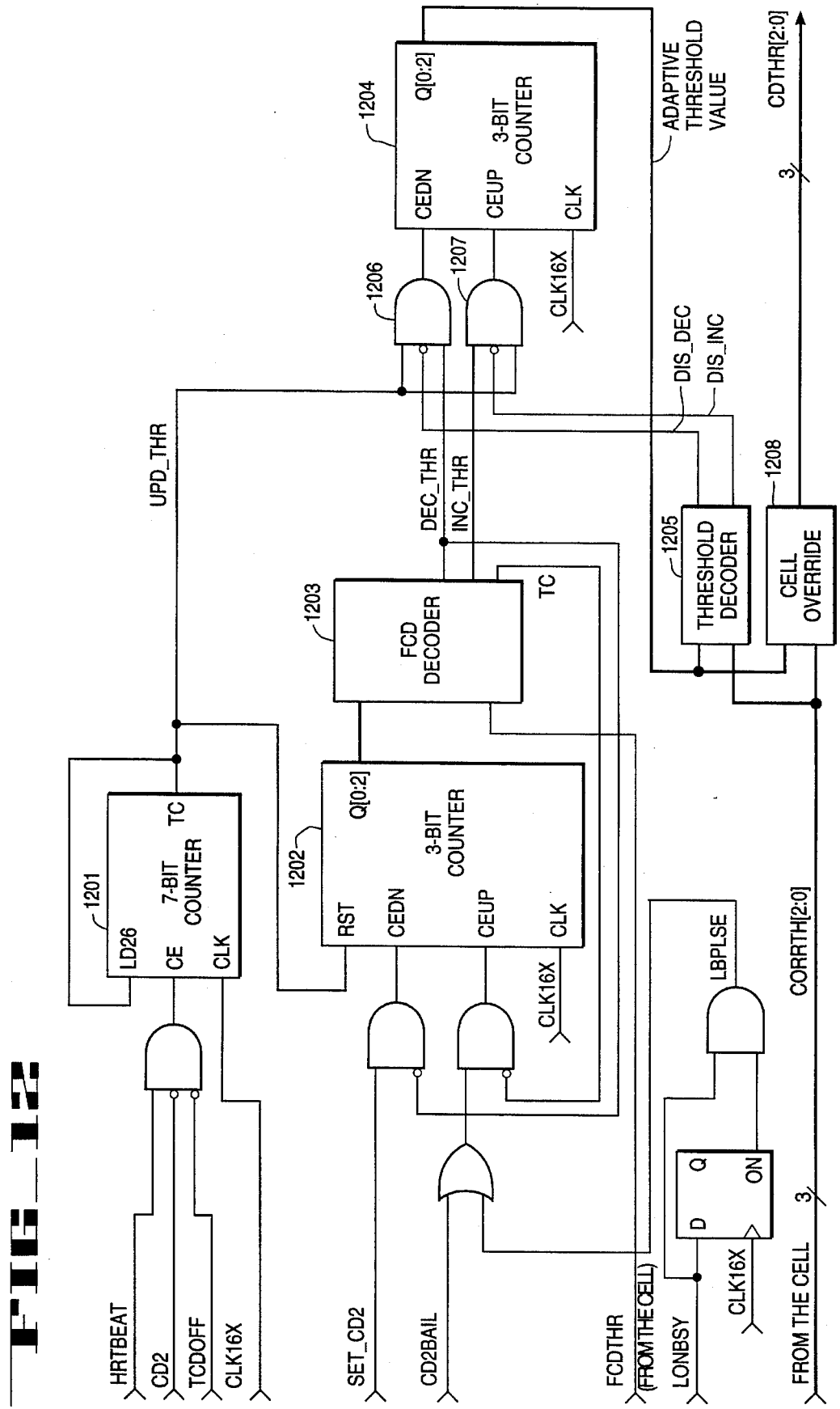
FIG_12

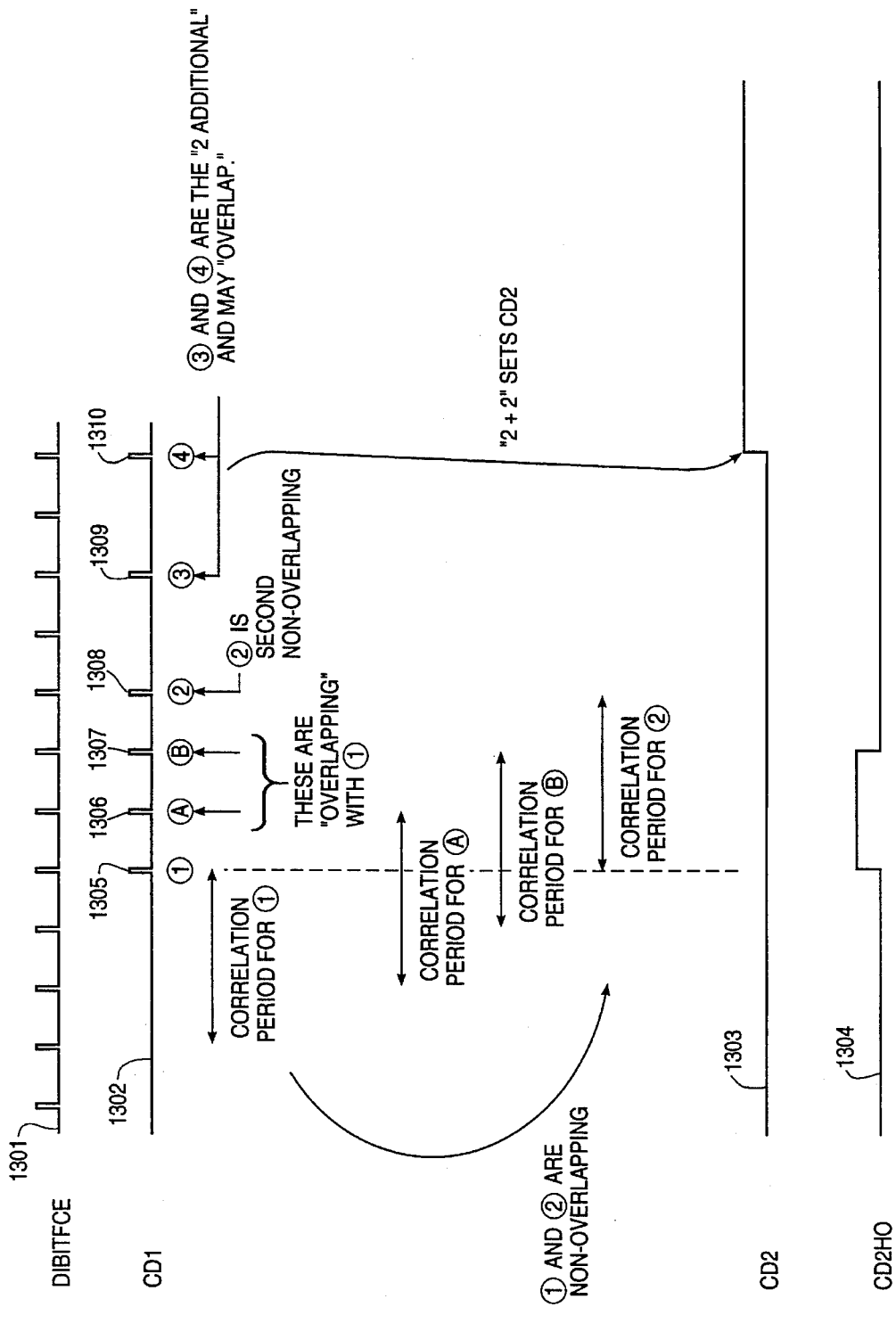

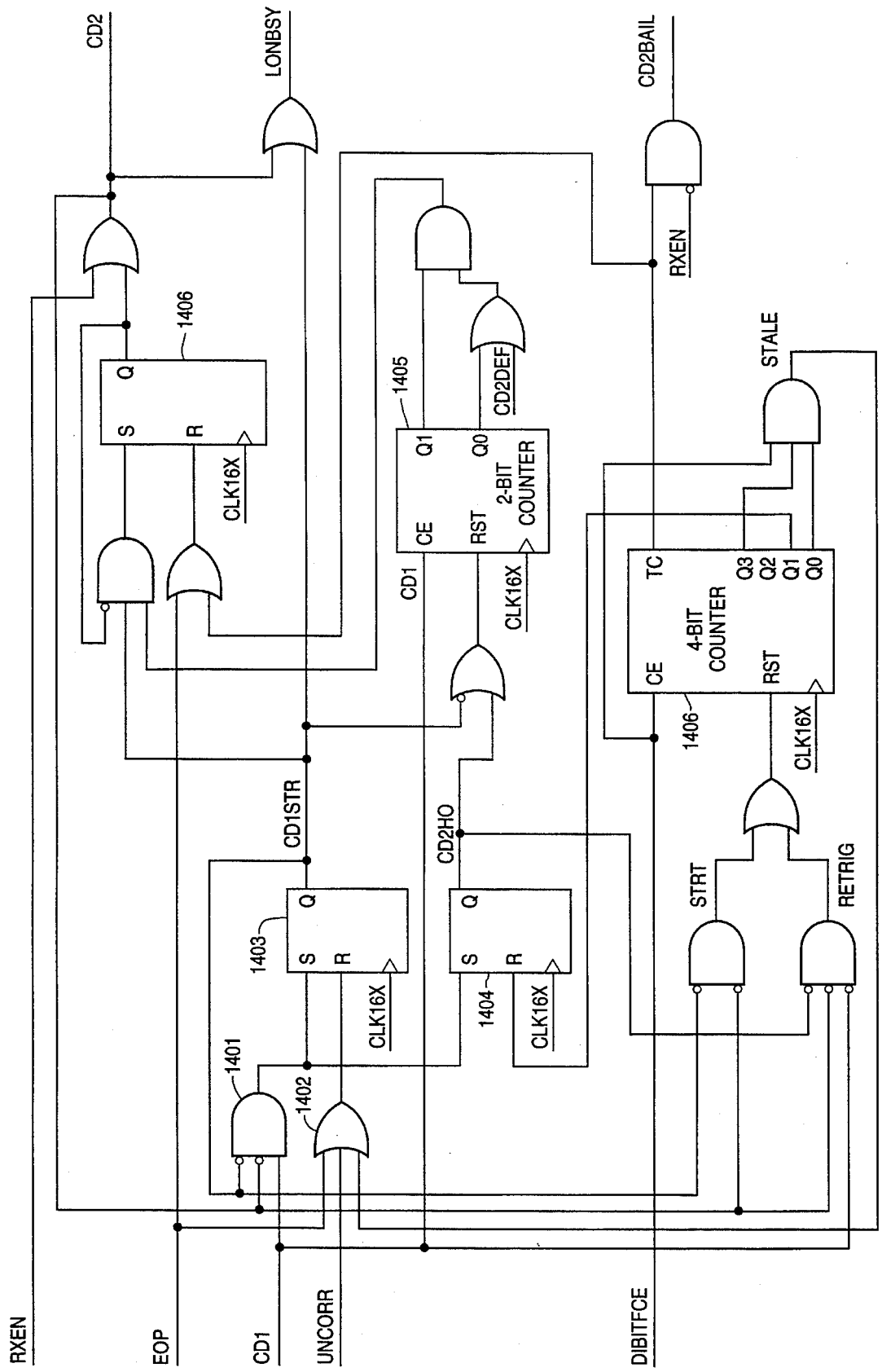
FIG_14

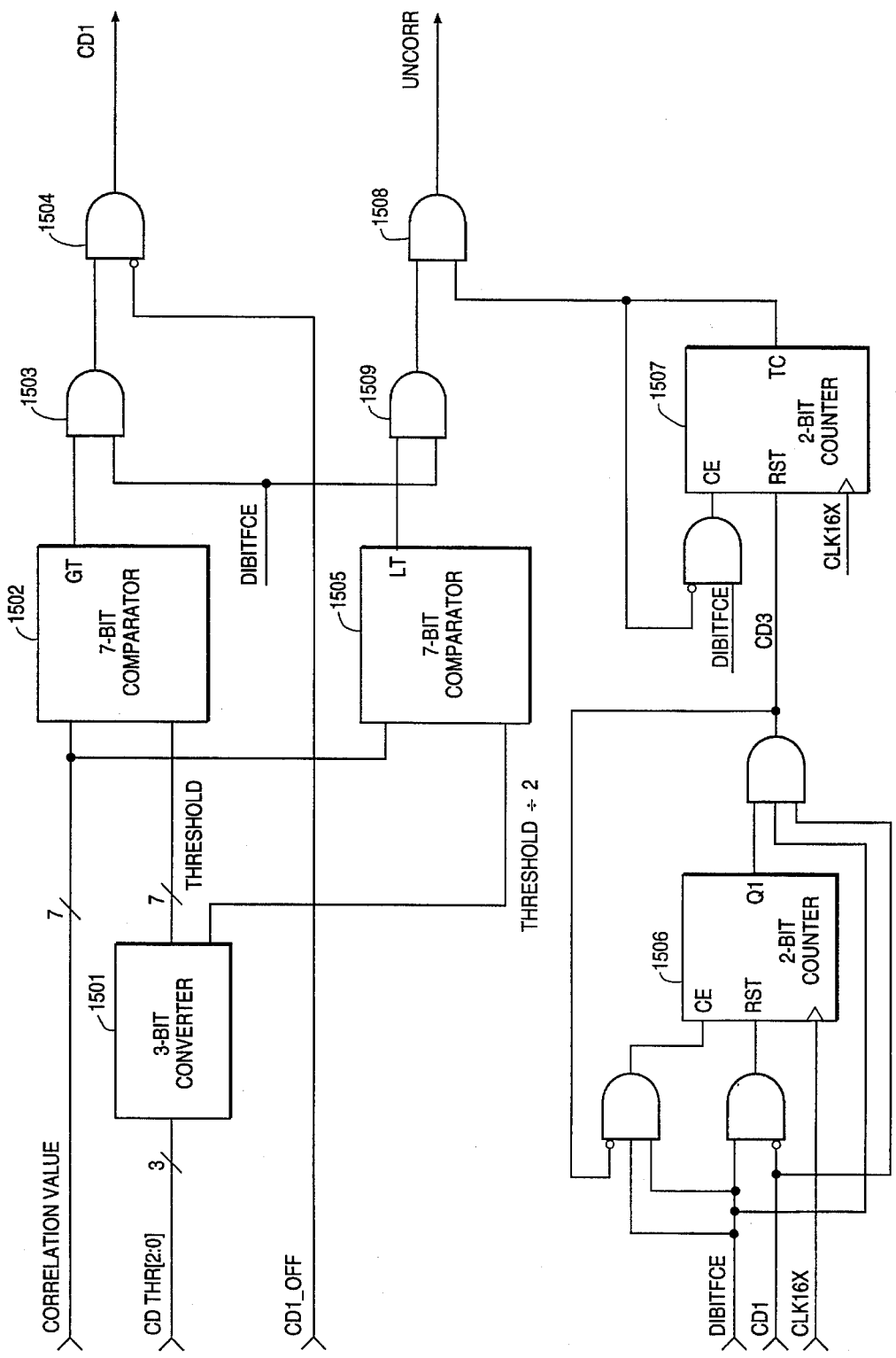
FIG_15

FIG_16A BPSK MODULATION
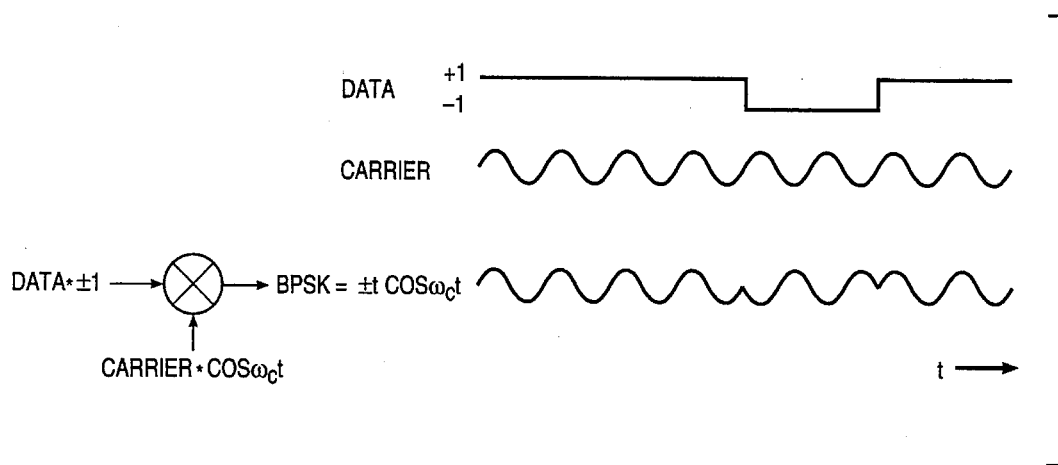
FIG_16C
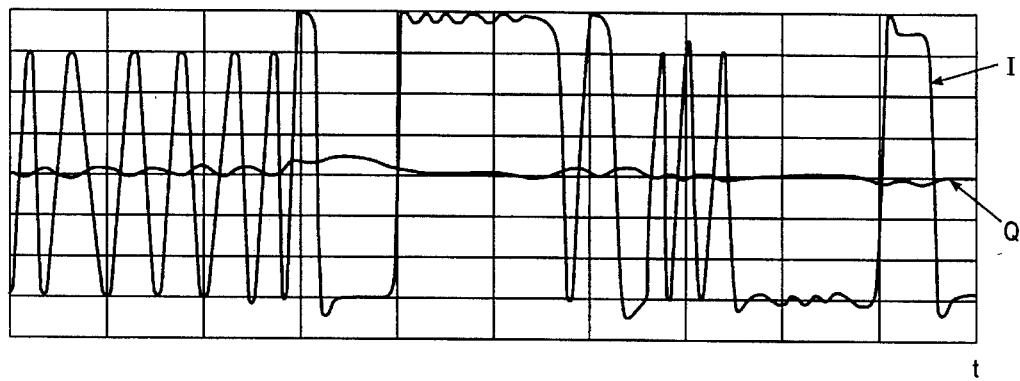
FIG_16D
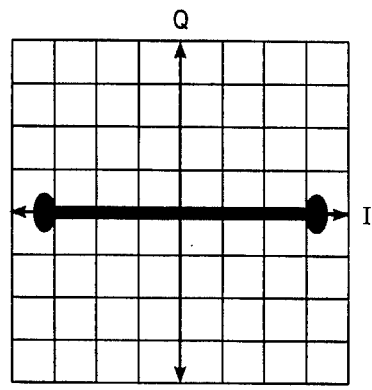

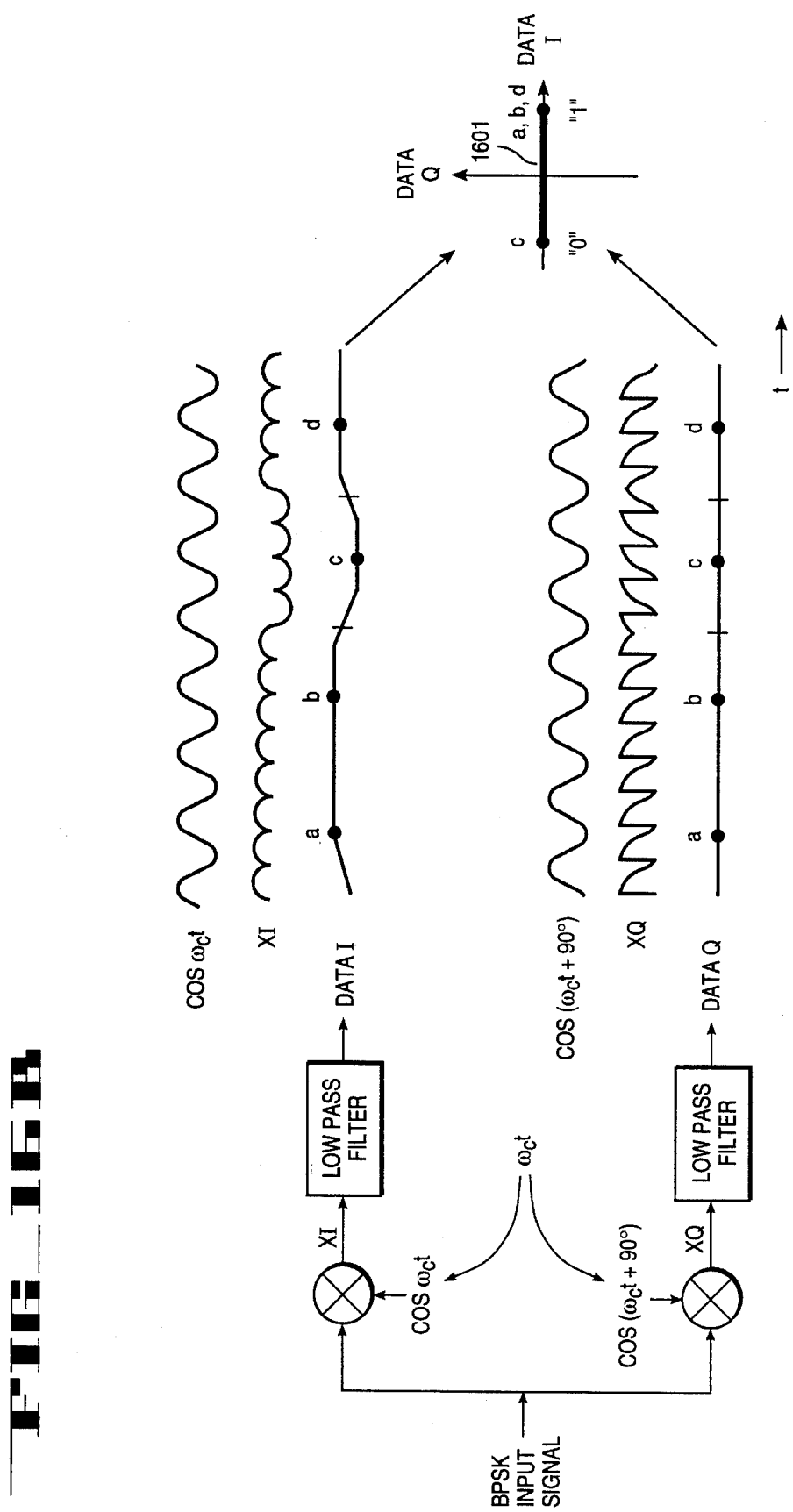

FIG_16E
FIG_16F
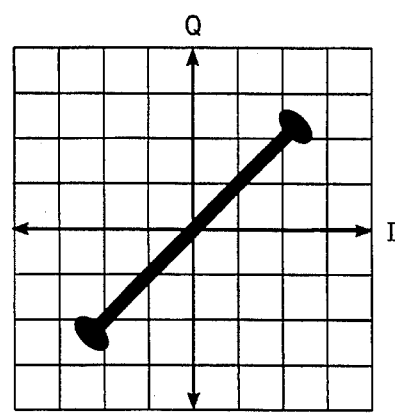

FIG_16G
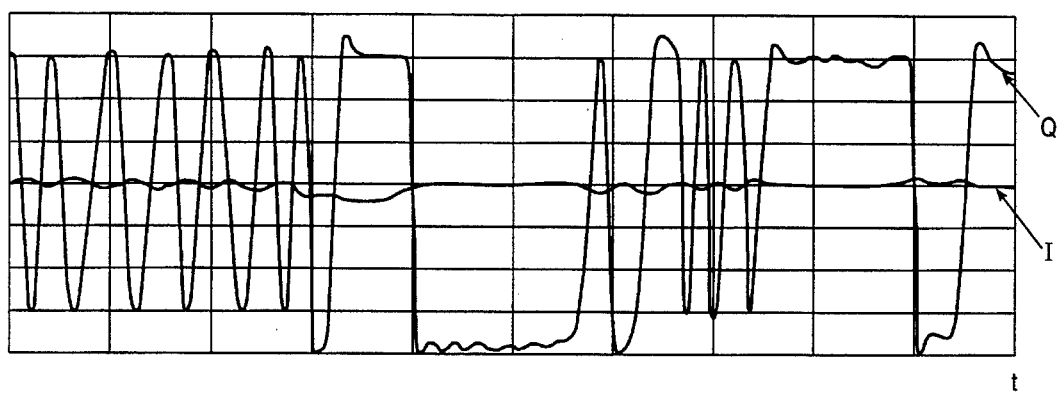
FIG_16H
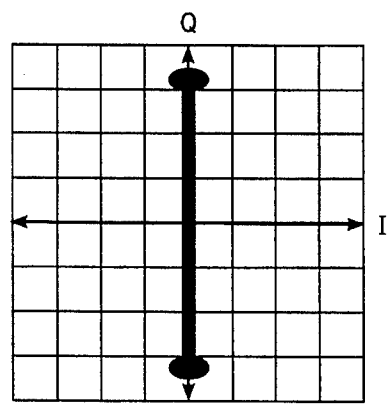

FIG_16I
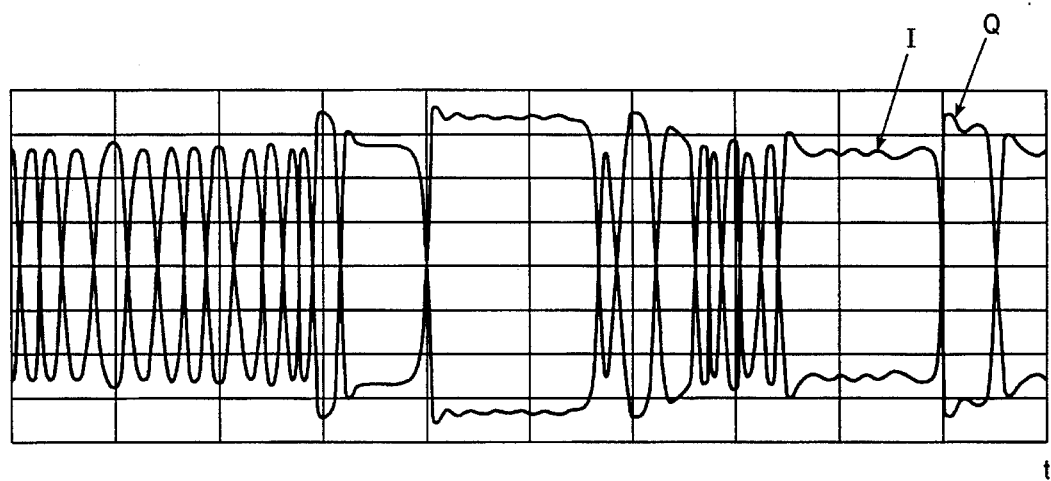
FIG_16J
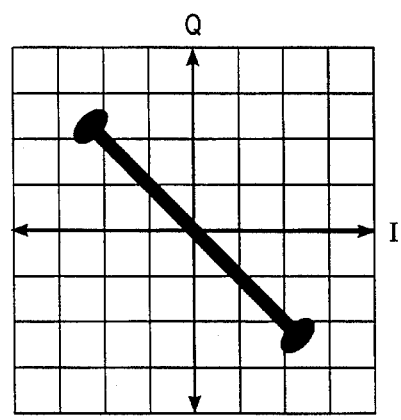

FIG_16K
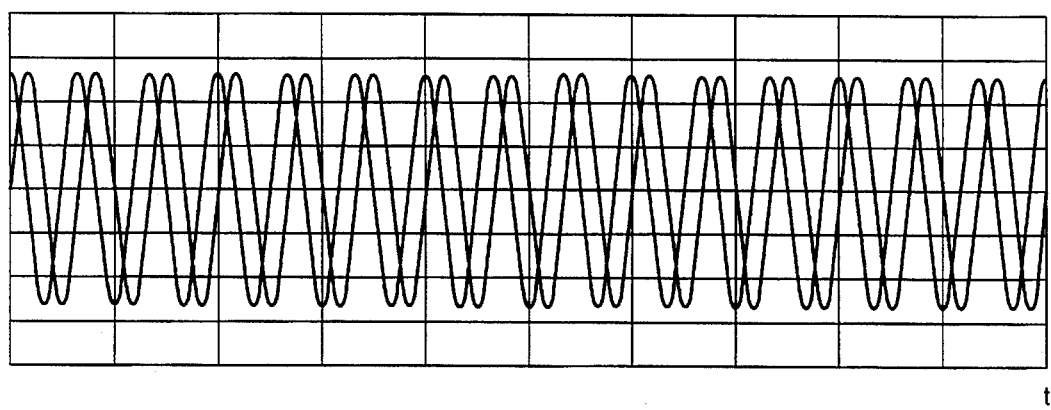
FIG_16L
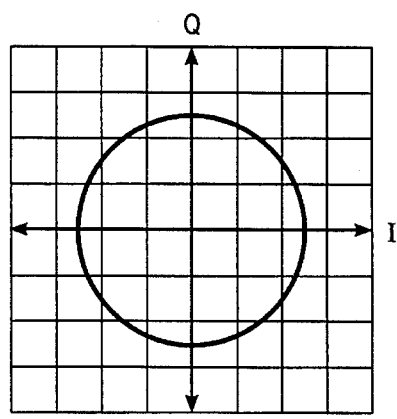

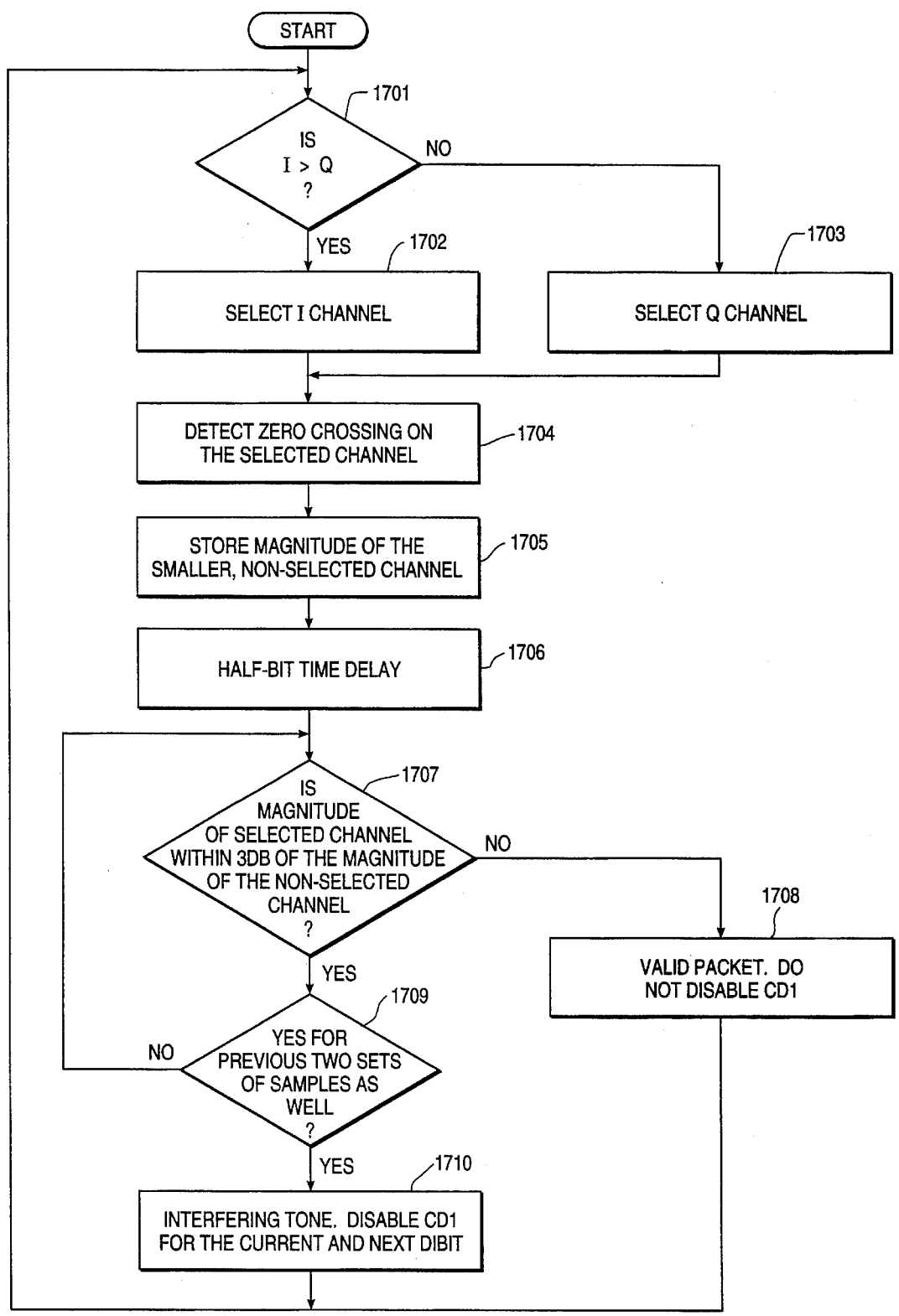

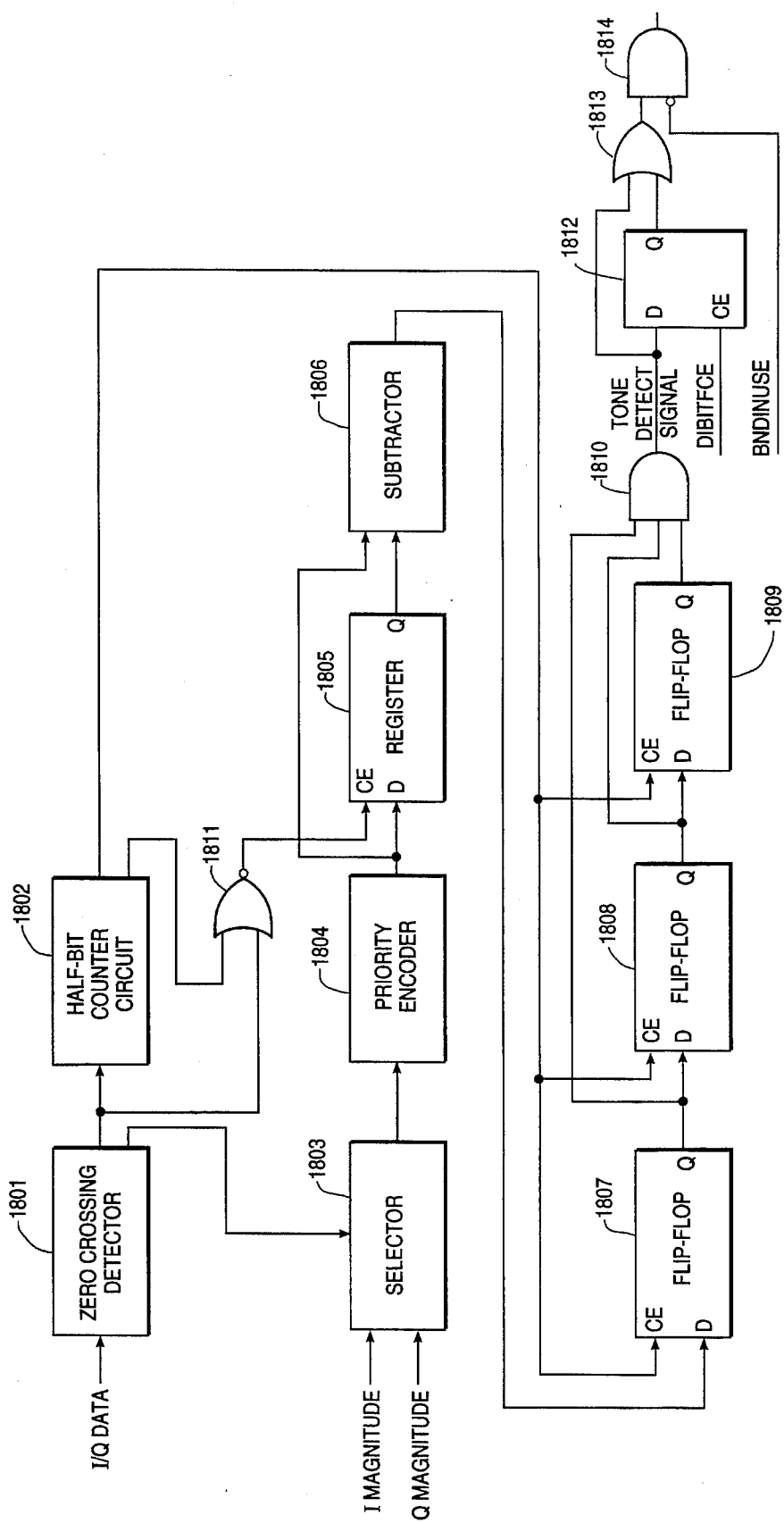

APPARATUS AND METHOD FOR DETECTING A SIGNAL IN A COMMUNICATIONS SYSTEM

FIELD OF THE INVENTION

The present invention pertains to the field of communication systems. More particularly, the present invention relates to an apparatus and method for detecting a signal in a high noise environment.

BACKGROUND OF THE INVENTION

Typically, communications between various nodes on a network are transmitted through a dedicated medium such as coaxial cable, twisted pair wire, or fiber optic cable. These media can sometimes be expensive as they have to meet stringent transmission criteria. In addition, significant costs are incurred for physically routing the medium to each of the various nodes. Hence, it would be beneficial if the nodes could take advantage of an already existing medium for communication purposes.

One such medium is power distribution lines such as those found in virtually all homes, offices, and factories. In many cases these power lines distribute 120 volt AC (alternating current) to wall sockets, thereby supplying power to various devices such as appliances, computers, lights, etc. Because power lines are designed primarily for transmitting power, they are not ideally suited for communications. One major problem is that noise on power lines can be quite high due to electrical interference emanating from the very devices being powered.

Noise can have many of the same characteristics as the data being transmitted. Conversely, data signals can be severely distorted by the power line. Thus, a received signal will generally contain both distorted data signals and additive noise. Therefore, some mechanism must be implemented to distinguish distorted data plus noise from noise only in order to maximize the output signal to noise ratio (SNR).

This mechanism is called signal or carrier detection. Carrier detection can be based on the received signal energy level or on the level of correlation to an expected reference. In either case, the carrier detector typically processes the received signal to generate a qualification signal. This qualification signal is then compared to a threshold to determine how likely it is that the incoming signal contains a valid message. The goal is to fix a threshold such that random noise does not trigger the signal detect indication, while valid signals of less than ideal energy or correlation do trigger signal detect indications.

In a shared-access network, each transceiver typically has a channel busy indicator, which is used to avoid collisions by holding off new transmissions when the channel has been determined to be in use. Consequently, false signal detections, which initiate a channel busy indication, reduce the overall network throughput. Thus network throughput is maximized by selecting a threshold high enough so that noise does not exceed it. On the other hand, a transceiver's sensitivity to weak or distorted messages is maximized by selecting a lower threshold. Thus, a threshold must be selected which optimize system performance considering these competing criteria.

Further complicating matters is the fact that the optimum threshold can vary with time as the network environment changes. Selecting a fixed threshold is therefore a poor compromise, and an adaptive threshold mechanism is needed. Although it is apparent which parameter needs to be adapted (i.e., the signal detect threshold) determining an optimal adaptation algorithm is less obvious.

One prior art approach for detecting valid signals involves correlating a received signal against a known, expected waveform. When using a correlator for a signal detect function, it is desired to know the peak of the cross correlation between a received waveform and an expected waveform. The peak of the cross correlation is the value which shows how closely the received waveform matches the reference (expected) waveform. There are basically two kinds of correlators known in the art—parallel correlators and serial correlators. Parallel correlators perform an integration over a given time interval (e.g., usually the period of the reference waveform) of the product of two waveforms. This integration is performed at a rate of every sample time. Hence, the peak of the correlation can then be determined to within the accuracy of the sample time. The integration of the product of the two waveforms has to be done in real time. Parallel correlators require a great deal of hardware because of all the numerous multiplication and addition functions that are required (per unit time). Also, both waveforms have to be stored so that, at every sample time (there are usually many sample times during a waveform), the full time duration of both waveforms can be multiplied and integrated. This requires additional hardware to store the waveforms. Consequently, parallel correlators are quite complex and expensive to implement.

Serial correlators, on the other hand, perform one integration over some time interval (usually the period of the reference waveform) of the product of two waveforms, but only at a rate commensurate with the period of the reference waveform. Therefore, only a single multiply and accumulate needs to be performed at every sample time. Consequently, the amount of hardware required is small. Furthermore, only one sample of each waveform needs to be in storage at a given sample time. A limitation of serial correlators is that they only find the value of correlation at one phase. The correlation value varies with phase so that the phase of the peak correlation must first be found. For a modulated signal, the peak correlation varies with both carrier phase and modulated waveform phase. Thus, prior to performing the serial integration, the peak over all the phases must be found. At each phase and for the period of the reference waveform, a serial waveform multiply and integrate is performed. The problem with this approach is that it takes significant time to detect a valid signal.

It is critical to keep the signal detect time to a minimum because some communication systems are designed to transmit a large number of small messages (e.g., packets). The throughput of such systems would be severely limited if it took a long time to detect each of the signals associated with these small, but numerous, messages. The problem, however, is that the shorter the amount of time allowed to detect the signal, the harder it becomes to accurately detect it. In other words, as the detect time is decreased, the probability for false signal detects increases.

Further complicating matters is that in some environments, there may be interfering tones imposed on the communication channel. Switch-mode power supplies, for example, conduct interference back onto power distribution lines at their operating frequency and its harmonics. In the event that one of these interfering tones occurs at a frequency near the communication frequency, it might be falsely interpreted as a valid transmission. Hence, it would be beneficial if there were some means to further distinguish valid signals from interfering tones.

Another challenge in signal detection is related to the transmission of different types of data packets on the same medium. Different types of data packets being transmitted over the same medium at the same time may interfere with each other. In order to address this issue, in some cases, an access protocol is promulgated by a governing body to regulate the transmissions of various modems/transceivers manufactured by different vendors. Such an access protocol specifies certain transmission characteristics and signal detection characteristics that must be met so that the medium can be efficiently and harmoniously shared by different types of transceivers.

Therefore, what is needed is an apparatus and method for reliably and accurately detecting a valid signal in a communications system. It would be preferable for the apparatus and method to adaptively optimize its detection criteria to changes in the operating environment. Furthermore, it would be beneficial if such an apparatus and method minimized the hardware requirements and the carrier detect time by implementing a correlator which uses serial correlations and does not have to take time to search for the peak phase. It would also be preferable if such an apparatus and method maximized its performance without violating any applicable access protocol.

SUMMARY OF THE INVENTION

The present invention pertains to an apparatus and method for detecting a signal in a communications system. In one embodiment, an adaptive threshold is used to qualify a received signal. A number of false detects occurring within a specified time interval is determined. A false detect is counted based first upon a quick, initial qualification process. Subsequently, a more accurate qualification process is performed. If the second level of qualification determines that the signal is a valid data signal, the number of recorded false detects is adjusted. Thereupon, the threshold is adjusted to maintain the frequency of false detects within a predetermined range.

The signal detection can be accomplished by either an energy-based or a correlation-based scheme. In one embodiment, an energy detector is used in conjunction and in parallel with a correlator in order to optimize performance while complying with an access protocol. With respect to the correlator, the transmitted signal is modulated with a particular pattern. Upon receiving the signal, it is down-converted to in-phase and quadrature-phase channels. The down-converted signal is correlated against multiple reference patterns, and the references are combined to provide a measure of peak correlation that is independent of both pattern phase and carrier phase.

In the preferred embodiment, further qualification of the received signal is accomplished by using a tone-detector to distinguish valid signals from interfering tones.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates a typical application of the present invention within transceivers of a communications network.

FIGS. 2A–C show block diagrams of a transceiver upon which the currently preferred embodiment of the present invention can be practiced.

FIG. 3 shows a flowchart describing the steps for performing the adaptive carrier detect qualification process.

FIG. 4 shows a flowchart describing the steps for determining the number of false carrier detects.

FIG. 5 shows the plot of a sample correlation waveform.

FIG. 6 shows a sample packet, including the preamble contents.

FIG. 7A shows an I-Q diagram representation of a received signal.

FIGS. 7B and 7C show sample waveforms of the outputs of a correlation detector circuit for a channel for two different received phases.

FIG. 8 shows a block diagram of the receive front-end and correlation detector.

FIG. 9 shows the circuit diagram for performing the correlation function.

FIG. 10 is a circuit diagram for generating the signal that indicates which of the two channels was bigger.

FIG. 11 shows timing diagrams for various signals used in detecting carrier and in setting the adaptive threshold.

FIG. 12 shows a circuit diagram for setting the adaptive threshold.

FIG. 13 shows the timing diagrams for the carrier detect and qualification signals.

FIG. 14 shows a circuit diagram of the carrier qualification logic.

FIG. 15 shows a circuit diagram of the CD1 and UNCORR signals generator.

FIG. 16A shows a BPSK modulator.

FIG. 16B shows a BPSK demodulator.

FIGS. 16C–16J show I and Q signals and I-Q plots of valid packets at various received phases.

FIGS. 16K–16L show I and Q signals and I-Q plots for noise tones.

FIG. 17 shows a flowchart describing the steps for distinguishing between interfering tones and packets.

FIG. 18 is a block diagram of one embodiment of a tone detector.

DETAILED DESCRIPTION

An apparatus and method for detecting carrier signals in a high noise environment is described. In the following description, for purposes of explanation, numerous specific details are set forth, such as frequencies, reference signals, correlation values, thresholds, etc., in order to provide a thorough understanding of the present invention. It will be obvious, however, to one skilled in the art that these specific details need not be used to practice the present invention. In other instances, well-known structures and circuits have not been shown in detail in order to avoid unnecessarily obscuring the present invention. In addition, it should be noted that the present invention applies to a wide range of transmission media, such as power lines, twisted pair wirings, coaxial cables, radio frequency communications, etc. Furthermore, many different types of protocols as well as modulation schemes are covered by the present invention.

Systems Overview

There are a number of commercially available products which provide sensing, control, and communications in a network environment. These products range from elaborate systems having a large mount of intelligence to more simple and less expensive systems. One example of such a system, comprising a network of intelligent cells in which the cells sense, control, and communicate, is described in Markkula, Jr. et al. U.S. Pat. No. 4,918,690.

Referring to FIG. 1, a typical application of the present invention within transceivers 101 and 102 of a communications network 100 is illustrated. Communications network 100 is comprised of a plurality of intelligent cells 103 and 104. In general, cells are programmable semiconductor chips providing remote control, sensing and communication functions. When interconnected via transceivers, the collaboration of cells have distributed sensing, communication, control, and configuration capabilities.

Groups of cells within a network perform particular functions. For example, cells 103 and 104 can provide control between a light switch and a light. When the light switch is operated, cell 103 sends a digital code on lines 105 to transceiver 101. When transceiver 101 receives the digital message from cell 103, it transmits the message in a coded format on line 107 to a coupling network, such as transformer 108 and AC coupling capacitors 109a and 109b. The message is then conducted via medium 110, such as a power line. Once transceiver 102 receives the coded data, it proceeds to decode the received signal and relays the message by way of a digital bit stream on line 105 to cell 104. Thereupon, cell 104 switches the light on/off.

FIGS. 2A–C show block diagrams of a transceiver 101 upon which the currently preferred embodiment of the present invention can be practiced. The transceiver is comprised of a receiver portion 201 and a transmitter portion 202. The receiver portion 201 includes blocks 204–229, and the transmitter portion 202 includes blocks 230–235. The cell interface 203 is shared by the transmitter portion 201 and the receiver portion 202.

Referring first to the receiver portion 201, analog signal processing, such as filtering and amplifying, is performed on a received binary phase shift keying (BPSK) signal prior to its input to the sigma-delta converter 204. Sigma-delta converter 204 is a wide-band analog-to-digital converter that converts signals whose frequencies range from 0 to 5 MHz and outputs a high speed (10 Mbs) bit stream. The bit stream is then filtered by a finite impulse response (FIR) filter 205 to filter out the higher frequencies. Note that the sigma-delta converter 204 shapes the noise spectrum so that the noise can be more readily filtered out by the FIR filter 205. The 8-bit serial stream from FIR filter 205 is further filtered by a high-pass infinite impulse response (IIR) filter 206. IIR filter 206 essentially performs DC offset correction. In other words, IIR filter 206 acts as an AC coupling capacitor in digital logic for blocking DC components.

Next, the received signal is down-converted to baseband In-phase (I) and Quadrature (Q) channels by mixers 207 and 208. Thereupon, decimators 209 and 210 further reduce the sample rate by a factor of fifty-seven in the I and Q channels. This reduces the sample rate and increases the dynamic range. The outputs from decimators 209–210 are input to the blanking control with snubber 213. Blanking control with snubber 213 performs two functions. First, it maintains an indication of the average power of continuous signals in order to detect noise impulses. Once detected, these impulses are then snubbed. The snubbing is performed by blanking control with snubber 213 in conjunction with blankets with soft turn-on 211 and 212. Blankets with soft turn-on 211 and 212 blank signals with soft turn-ons under the control of blanking control with snubber 213. When an impulse is detected, each of the blankets with soft turn-on 211 and 212 blanks (i.e., zeroes) its channel for a predetermined duration, halves the amplitude of the signal on the channel for a second duration, and then resumes passing the signal through the channels. The average signal power indicator generated by blanking control with snubber 213 is also used by the automatic gain control (AGC) circuit 214 to control the gain of the receiver. The AGC ensures that the back-end of the receiver is not overloaded. Furthermore, the AGC is varied in response to whether a valid packet is being received, as indicated by the CD2 signal.

The received signal is then decimated by a factor of two (i.e., two samples are averaged) by decimator 215. Next, narrow band filtering is performed on the decimated signals from decimator 215 by the IIR filter 216. The sign/magnitude blocks 217 and 218 convert the decimated, filtered signal into two representative components: a single sign bit and a 10-bit magnitude. These sign and/or magnitude signals are used by the tone rejection 219, dotting correlator 220, baud phase-lock-loop (BPLL) 224, IQ pointer/combiner 226, and band-in-use detector 229 blocks.

The carrier detect function is performed by the dotting correlator 220, CD1 generator 221, CD2 generator 222, adaptive threshold circuit 223, and tone rejection 219 blocks. The dotting correlator 220 compares the single-bit-limited signals (i.e., sign bits) from the sign/magnitude blocks 217–218 and the IEQ0 and QEQ0 signals from the IQ pointer/combiner 226 against a set of known reference patterns. The signals IEQ0 and QEQ0 indicate that the magnitude signals IMAG[9:0] and QMAG[9:0], respectively, are exactly zero. Note that the full magnitude signals are not used by the dotting correlator 220 but only their signs and whether or not they are equal to zero. Based on this comparison, a correlation value, which indicates the likelihood that the received signal is a valid carrier, is generated. This measure of correlation is input to the CD1 generator 221. The CD1 generator performs a quick, first-level of qualification by determining whether the correlation value exceeds a current threshold. The current threshold is determined by the adaptive threshold circuit 223. The CD1 generator 221 can be disabled by the tone rejection circuit 219. The tone rejection circuit distinguishes between tones which might result in false carrier detects and packets as described below. If such a tone is detected, the CD1 generator is disabled.

A second, more accurate level of qualification is performed by the CD2 generator 222. The CD2 generator 222 generates signals CD2 and LONBSY, which are used by the adaptive threshold circuit 223 to adapt the level of the threshold to the current operating environment. Furthermore, the LONBSY signal informs the cell interface 203 that another node on the network is presently transmitting, so that this particular node does not start a transmission of its own.

The baud phase-lock-loop (BPLL) block 224 is used to establish bit synchronization. Bit synchronization is important since proper decoding of the data bits requires sampling the I and Q data channels in the middle of each bit. The center of each bit is marked by the BITCEQ signal. It should be noted that the dotting correlator 220 processes its signals in parallel and independently from bit synchronization. This feature allows for a fast carrier detection scheme. The BPLL block 224 has two modes of operation. At the beginning of a packet, the BPLL block 224 is in an acquisition mode in order to quickly attain bit synchronization. Once word synchronization is established by the word sync detector 225, the BPLL block 224 is placed in a track mode to continue bit synchronization during packet reception.

The IQ pointer/combiner block 226 is used to robustly decode the incoming data once carrier has been detected and word synchronization has been established. The decoded serial bit stream RXDATA is sent to the error correction (single bit and phase inversion) block 228. Both sign and magnitude information from the sign/magnitude blocks 217–218 are mapped onto an IQ diagram. The locations of the mapped data bits are used to generate an IQ pointer. The IQ pointer tracks the phase of the incoming data and detects changes in the phase response of the communication channel. The PHWT[2:0] signal sent to the error correction circuit 228 indicates the likelihood that a phase shift occurred which could result in a data inversion. Furthermore, the IQ pointer/combiner block 226 outputs the signals IGTQ, IEQ0, and QEQ0 to the dotting correlator 220. This IGTQ signal informs the dotting correlator which of the two channels (i.e., I or Q) contains the larger signal and thus should be used for measuring the correlation. Dotting correlation is established independent of carrier phase and pattern phase. In addition, the IQ pointer/combiner outputs an IQMAG[10:0] signal to the weak bit detector 227. The IQMAG[10:0] signal represents for each bit an approximate amplitude of the recovered data.

The weak bit detector 227 in conjunction with the error correction block 228 are used to perform single bit error correction. The function of the weak bit detector is to indicate the bit in each word that is most likely to be in error (i.e., the "weak" bit). Whenever the AGC 214 switches states, a transient may be produced which might cause that particular bit to be erroneous. Hence, if the AGC is switched during a particular bit time, that particular bit is designated as the weak bit. Otherwise, the bit corresponding to the smallest amplitude of recovered data is designated as the weak bit. The output of the weak bit detector 227 is a 4-bit signal specifying which of the 11 bits in each word is the weak bit. This information is sent to the error correction block 228.

The error correction block 228 not only performs single bit error correction but also phase inversion correction. For single bit error correction, a parity bit and the weak bit signal, respectively, are used to detect and then correct the erroneous bit. For phase inversion correction, an encoding scheme and the phase weight PHWT signal, respectively, are used to detect and then correct for phase inversions of the signal. The EOP signal generated by the error correction block 228 indicates the end of a packet. This EOP signal resets the CD2 generator 222. Finally, the decoded and corrected 8-bit data byte and control signals (CNTL) indicating the presence of the decoded data are sent to the cell interface 203.

The band-in-use detector 229 determines whether the output from the sign/magnitude blocks 217–218 exceeds a certain fixed energy threshold. This band-in-use detection is performed in order to efficiently share the transmission medium amongst transceivers from different manufacturers.

The transmit path begins with the cell interface 203. When the cell sends a request to transmit to the cell interface 203, the interface decides whether the transceiver may start transmitting at that time. If the receiver portion 201 detects that another transmission is currently in progress, LONBSY is asserted, which indicates that the channel is busy, and execution of the request to transmit is delayed. In another instance, the access protocol of cell interface 203 may delay the execution of a request to transmit (i.e., as specified by the band-in-use detector 229).

If the request to transit is accepted, a preamble is generated by the preamble generator 230. The data stream from the cell is then encoded by encoder 231. The encoding supports both single bit error correction and phase inversion correction. Three bits of coding are added to every eight bits of data. Multiplexer 232 multiplexes the preamble, data, and coding bits. The transmit waveform is stored in read only memory(ROM) 234. A ROM addressing unit 233 addresses ROM 234 to output the transmit waveform. The ROM data is then processed by the ROM data processor 235 to generate the proper waveform corresponding to the bit to be transmitted. The 8-bit transmit data output from the ROM data processor 235 is output to a digital-to-analog converter which drives the transmission medium with an analog signal.

Adaptive Signal Detection

In general, the adaptive carrier detect process of the present invention performs two levels of signal detect qualification. It should be noted that the signal detector/qualifier can be based on either an energy or a correlation detection scheme. The first level of qualification performs a quick, initial determination as to whether the received signal is a valid packet. A feedback loop is implemented that regulates a signal detect threshold to allow a low frequency of false signal detects. By allowing some low number of false signal detects, the present invention achieves greater sensitivity for receiving and correctly detecting impaired data signals. Yet, the regulation point is set such that the frequency of false signal detects has minimal impact on the communication network's throughput. Next, a second level of signal detect qualification is performed. This second qualification is allowed a longer decision time. Thereby, it has a higher probability of correctly determining whether the received signal is a valid data signal. Based upon the results of this second level of qualification, the recorded number of false detects is adjusted.

FIG. 3 shows a flowchart describing the steps for performing the adaptive signal detect qualification process. For purposes of illustration, the following description is in reference to carrier signals. However, these steps can be applied to non-carrier signals (e.g., baseband signals) as well. Initially, a false carrier detect counter is reset, step 301. The false carrier detect counter counts the number of false carriers that were detected within a given time interval. A separate timer counter is used to specify a pre-determined interval of time. This timer counter is also initially reset and then run, step 302. In step 303, the transceiver determines whether it is transmitting. If so, the timer counter is temporarily halted during the time of the transmission, step 304. If the transceiver is not transmitting, a determination is made as to whether or not the transceiver believes that there is a valid packet on the line, step 305. Again, the interval timer is stopped, step 304, if the transceiver believes that it is receiving a packet. The interval timer is temporarily halted for these two cases because it is difficult to detect false carrier detects while either transmitting or receiving a packet.

Otherwise, the transceiver continues updating the interval counter, step 306. The transceiver monitors the interval counter to determine whether the pre-determined time interval has elapsed, step 307. During this interval, the transceiver counts the number of false carriers that were detected. Once the interval has elapsed, the transceiver determines whether the number of false carrier detects during that interval is less than that of a first predetermined value, step 308. If so, this indicates that the transceiver is receiving a minimal number of false carrier detects. Hence, the receiver sensitivity can be increased by lowering the carrier detect threshold, step 310. However, if the carrier detect threshold is already set at its minimum value, it is not lowered, step 309. On the other hand, if it is determined that the number of false carrier detects occurring during that interval exceeds a second pre-determined value, step 311, this indicates that the transceiver is operating in an environment where noise has a high degree of correlation. Hence, the carrier detect threshold is incremented, step 313, provided that its maximum value is not exceeded, step 312. Thereupon, the false carrier detect and interval counters are reset and the process repeats, step 301, and step 302. It can be seen that through this carrier detect qualification process, the transceiver automatically adapts to its current operating environment.

FIG. 4 shows a flowchart describing the steps for determining the number of false carrier detects. Initially, a recovered signal is compared to the current threshold level, step 401. For example, assuming that a correlation detector is utilized, the transceiver's correlator compares received signals against a known preamble pattern. Based upon this comparison, the transceiver determines whether the correlation value of the received signal is greater than the current carrier detect threshold. If the correlation exceeds the current carrier detect threshold, a first carrier detect signal (CD1) is generated. The transceiver sets a channel busy flag (LON-BSY), step 402. Setting the channel busy flag indicates that the channel is busy and prevents the transceiver from transmitting. Steps 401 and 402 constitute the first level of qualification.

In step 403, a determination is made as to whether the false carrier detect counter is presently at its maximum value. If the false carrier detect counter is not at its maximum value, it is incremented by one false carrier detect count, step 404. Note that the false carrier detect counter is incremented even though it is not known at this time whether the received signal is a valid packet or whether it is a false carrier detect.

Subsequently, the second level of qualification is performed. The second level of qualification takes a longer time, but it results in a more accurate determination as to whether the received signal was a valid packet or a false carrier detect. If the received signal meets the criteria of the second level of qualification, a second carrier detect signal (CD2) is generated. In step 405, a determination is made as to whether the received signal resulting in the generation of CD1 also results in a CD2 signal being generated by the second level of qualification. If so, this indicates that the received signal is most likely a valid packet. Consequently, this indicates that the false carrier detect counter was erroneously incremented by the first level of qualification in step 404. In order to correct this false assumption, the false carrier detect counter is decremented, step 408. However, if the false carrier detect counter is already at its minimum value, it is not further decremented, step 407. Conversely, if it is determined that no CD2 signal follows the CD1 signal, the received signal is determined to have been a false carrier detect. Since the false carrier detect counter had previously been incremented in step 404, no further action need be taken with respect to that counter. The channel busy flag is then cleared, step 406.

Correlation Detector

In the currently preferred embodiment, a correlation detector produces a correlation value to determine whether valid data is present. As noted above, an energy-based detector could be used in lieu of (or in addition to) the correlation detector. However, energy detectors are limited to detecting data signals that are above the background noise energy on the line. In contrast, a correlation detector can detect data signals which are smaller than the background energy on the line, provided that the background noise does not have a high degree of correlation to the reference receive waveform. Furthermore, a correlation detector allows the transceiver to distinguish packets belonging to the present system from packets on the line belonging to other types of systems. Moreover, the correlation detector is independent of carrier phase and bit phase. This is accomplished by choosing a particular pattern for carrier modulation and then processing the modulated carrier in such a way that it results in a correlation that is independent of the pattern phase and carrier phase. It should be noted that the periodicity of this pattern need not be related to that of the transmission baud rate. Furthermore, the correlation value does not depend on the power level of the incoming signal, but rather on the signal to noise ratio. In addition, the correlation detector can operate on single-bit-limited data, as well as distinguish between packets and noise sources. Basically, the correlation detector outputs a number which represents how closely the input waveform resembles a valid modulated carrier at any given time. This number is used in the first level of qualification (CD1 generation). Ideally, the correlation detector outputs a zero for noise and other unrelated carriers.

The definition of correlation is usually defined in terms of the integral given below:

$$R_{xy}(\tau) = \int_{-\infty}^{\infty} x(t)y(t-\tau)dt$$

In general, the cross correlation of two signals, x(t) and y(t), as a function of delay ($\tau$) is equal to the integral of the time product of one signal by the other signal incrementally delayed. This integral is calculated from minus infinity to positive infinity because, theoretically, the signals could have infinite duration. This is referred to as a sliding integral since for each value of $\tau$ (a variable which represents a sliding of the phase between the two waveforms), an integral has to be performed. In practice, the integral is performed over a finite interval, which is usually the duration of the signals.

FIG. 5 shows the plot of a sample correlation waveform 500. At some delayed value, there is a correlation peak 501. Note that the correlation is usually a strong function of the phase, which is represented by the delay variable, $\tau$. To determine the peak correlation of a signal with an unknown phase requires a sliding integral. Since this requires a waveform multiplication and an integration for each value of $\tau$ done in real time, the number of mathematical operations per unit time is high, as is the cost of the hardware to perform the operations.

In order to avoid the use of a sliding integral, the correlator of the preferred embodiment determines how closely a signal matches that of a periodic reference pattern by computing two coefficients, each of which is a single serial correlation, and then combining the coefficients into a third value. This third value is the absolute value of the sum of the two coefficients and represents a phase-independent correlation. Thus, only two integrations are necessary. Furthermore, the reference patterns chosen are simple and are generated in real time, thereby eliminating the need to store the reference patterns. Since the multiplications and integrations are performed serially, the hardware needed for computation is reduced, and the need for storage of the incoming waveform is eliminated.

In the currently preferred embodiment, the reference pattern is placed at the beginning of the preamble, which is transmitted at the beginning of each packet. FIG. 6 shows the waveform of a sample packet preamble. A packet is shown as 600. The packet 600 includes a preamble 601, followed by a number of data words 602–604, and end of packet words 605 and 606. The preamble 601 is further broken into a dotting pattern consisting of 24 bits of alternating 1's and 0's, followed by an 11-bit word sync pattern. The dotting pattern is used in the determination of the fast carrier detect (CD1) as well as the confirming carrier detect (CD2). The word sync pattern is used for word synchronization and for polarity detection. Because the packets use shaped modulation, the phase modulation of the dotting has an approximately sinusoidal shape. However, after demodulation and limiting, the received waveforms will return to an alternating one and zero square wave.

The correlator correlates the received dotting pattern as follows. The receiver's local oscillator is split into two signals which are in quadrature, that is 90° out-of-phase from each other. The received signal is multiplied by each phase of the receive local oscillator to form an in-phase I channel and a quadrature Q channel. Note that the phases of the receive local oscillator signals are independent of the phase of the received signal. When a signal is first received, its phase is unknown. FIG. 7A shows an I-Q diagram representation of a received signal. The phase is represented by the angle $\alpha$, while the amplitude is represented by the length of the vector 701. Vector 701 can be represented by the in-phase (I) component 702 and the quadrature (Q) component 703. The I and Q components each contain the received dotting pattern. Note that the amplitude and polarity of I and Q components are dependent on the phase angle $\alpha$. Hence, the dotting pattern can be mostly in I, mostly in Q, or split. Since it is not known a priori which channel (I or Q) will have most of the signal, both must be processed identically as described below. Also, the phase of the dotting pattern in each of the I and Q channels is unknown. Therefore, the correlation process must be independent of modulation waveform phase.

The sample period $T_0$ is chosen so that it is much less than the period of a dibit (a dibit refers to 2 bits), and there are N samples taken during each dibit. Note that also k*N samples can be taken over k dibits. This will still produce a phase independent correlation but will have better rejection of noise. Next, two coefficients $a_i$ and $b_i$ are calculated over N (or k*N) samples using the equations stated below. Note that the beginning sample need not line up with a dotting transition (i.e., transition in the dotting pattern from 0 to 1, or 1 to 0). It can start anywhere in the dotting and is thus independent of bit phase.

$$a_i = \sum_{n=1}^{N} V(nT_0) \times R_a(n)$$

$$b_i = \sum_{n=1}^{N} V(nT_0) \times R_b(n)$$

$V(nT_0)$ represents the demodulated and sampled dotting. $R_a(n)$ and $R_b(n)$ represent two components of the reference pattern. The equations each represent a serial correlation of the incoming dotting with a reference component. Next, the two coefficients are combined according to the following equation:

$$C_i = |a_i| + |b_i|$$

The value $C_i$ represents a time-independent peak correlation of the dotting pattern. At this point, there are two $C_i$s—one for each channel. The $C_i$'s may be combined to represent the total correlation. In the preferrred embodiment, the relative signal strengths in the I and Q channels are examined, and the $C_i$ from the channel which is known to be bigger is chosen, the other one being discarded. The dotting pattern, reference patterns $R_a$ and $R_b$, and the combination equation are dependent on each other and must be chosen such that $C_i$ represents or approximates a time-independent peak correlation value. In the currently preferred embodiment, the dotting is a "101010 . . ." pattern. The reference patterns are two square wave "101010 . . ." patterns having the same rate as the dotting but in quadrature with each other.

FIG. 7B and 7C show sample waveforms used for correlation in one of the channels (i.e., I or Q) for two different received phases and their corresponding correlation values assuming no noise. Note that $C_i$ is the same for both cases. It can be seen that for the waveforms shown in FIG. 7B, the coefficients are $a_i=32$; $b_i=0$; and $C_i=32$. Given that N=32, a $C_i$ correlation value of 32 corresponds to 100% correlation.

FIG. 7C shows a sample received waveform having a different phase as that shown in FIG. 7B. The coefficients for the waveforms shown in FIG. 7C are as follows: $a_i=16$; $b_i=16$; and $C_i=32$. Again, a 100% correlation is indicated, even though the received signal had a different phase.

In the currently preferred embodiment, the correlation is performed over a three dibit period, and the dotting is summed at sixteen times the bit rate. The correlation is performed over three dibits (three cycles of the dotting pattern). Correlating over longer periods tends to cancel out noise because, ideally, noise has zero correlation while the carrier has 100% correlation. However, since speed is important the correlation is limited to three dibit times. This would normally produce one correlation value every 3 dibit times. The timing of when correlation values are produced is independent of when packets are received. This leads to a sampling delay. Hence, if a new correlation were begun just prior to receiving a packet, the output of that correlation would show only a partial correlation, since for the first part of the correlation there was no packet yet. The second correlation value produced 3 dibit times later would show full correlation. So the first indication of full correlation can be up to 6 dibit times after the beginning of a packet: three dibit times for the correlation sampling uncertainty and 3 dibit times for the correlation duration.

In the preferred embodiment, to reduce this delay, the correlation values are produced every dibit time. This value corresponds to the correlation of the last three dibits. Hence, every correlation overlaps the previous correlation by two dibits. The redundancy in the overlap is taken into account in the generation of CD2. Now, since a new correlation is produced every dibit, the maximum delay for full correlation during a packet is only 4 dibit times: three dibit times for the correlation duration and one dibit time for the sampling uncertainty.

Referring to FIG. 8, a block diagram of the receive front-end and correlation detector is shown. The modulated carrier 801, having an arbitrary phase, is input to the main channel 802. The modulated carrier is then filtered by low-pass filter 803. The modulated carrier is split into its respective in-phase I and quadrature phase Q components by multipliers 810 and 811. In the currently preferred embodiment, the signals on the I and Q channels 804 and 805 are represented as digital quantities.

The I component on channel 804 corresponds to the 0 degree reference, and the Q component on channel 805 corresponds to the 90 degree reference. Each of the I and Q components are further filtered by filters 806 and 807. Next, the I and Q components are limited by limiters 808 and 809. Hence, an upward portion of the pattern is represented by a 1, whereas the downward portion is represented by a –1. A square wave reference pattern at the dibit rate is generated by generator 812. The reference pattern is split into 0° and 90° in order to generate the $R_a$ and $R_b$ components. Multiplier 813 is used to multiply the I channel with the 0° reference signal to generate an II signal. Multiplier 814 multiplies the I channel with the 90° reference signal to generate an IQ signal. Likewise, multipliers 815–816 multiply the Q channel with the reference signal at 0° and 90° to generate a QI and QQ signal, respectively. Binary multipliers 813–816 are implemented as XOR gates.

FIG. 9 shows the circuit diagram for implementing the correlation function. The four channels II, IQ, QI, and QQ generated from the circuit shown in FIG. 8 are input to summers 904–907, respectively. The signals on these four channels consist of serial bit streams which are sampled at sixteen times the bit rate (32 times the dibit rate). Summers 904–907 sum the results of each sample to essentially perform the integration. Hence, the four outputs of summers 904–907 contain the integral of the products of the I and Q demodulated receive waveforms with the $R_a$ and $R_b$ reference patterns.

At the end of each dibit, each of the summers 904–907 outputs a number between +31 and –32. Because the correlator is using waveforms which have been limited to a magnitude of 1, it either positively correlated 32 times, negatively correlated 32 times, or correlated somewhere in-between. The IEQ0 and QEQ0 bits, when true, prevent the summer from counting the sample as either positive or negative. In order to minimize hardware, a maximum of 31 positive correlations are allowed. As discussed above, the correlation is performed over three dibits. Consequently, the correlation values for the previous two dibits are stored in buffers 908–915. Note that the correlation for both I and Q are stored for each bit time because it is not known which of these components contain the highest energy at any given time. Next, data selector 916 is used to select either II or QI, depend on whether the I or Q channel is larger. Similarly, data selector 917 is used to select either IQ or QQ depending on whether the I or Q channel is larger. The IQSEL signal controls the selection process. The three outputs selected by data selector 916 are summed together by summer 918. Likewise, the three outputs from data selector 917 are summed together by summer 919. The output of each summer 918 and 919 is a number ranging from –96 to +93. The absolute value of the numbers from summers 918 and 919 is then calculated by blocks 920 and 921. Finally, these absolute values are summed together by summer 922. The output of 922 is the correlation value.

FIG. 10 is a circuit diagram for generating the signal that indicates which of the two channels was bigger. Comparator 1001 is used to compare the absolute value of I against the absolute value of Q at sixteen times the bit rate (32 samples per dibit). Summer 1002 is used to determine which of the two channels was greater more times over the 32-sample period. The result of this 32-sample compare (IGTQ32) is forwarded to the tone rejection logic, which is described later. For example, if the I channel was greater than the Q channel more times during a particular dibit period, then the I channel is the preferred channel. The results for the past two dibits are stored in buffers 1003 and 1004. Logic 1005 then makes a determination as to which of the two channels had the greater signal for two out of the last three dibits. The output from logic 1005 is the IQSFL signal, which controls the data selectors 916 and 917.

Hence, this correlation detector architecture permits the computation of the degree of correlation between a received signal and a reference pattern, wherein the method of computing the correlation function involves a serial multiplication followed by accumulation. The resulting correlation value is independent of pattern phase, bit phase, and carrier phase.

Set Adaptive Threshold

FIG. 11 shows timing diagrams for various signals used in setting the adaptive threshold. A DIBITFCE clock enable signal 1102 is a free-running signal that is asynchronous to the incoming packet and which has a period equal to that of a dibit (2 bits). Some examples of 7-bit correlation values obtained while receiving the preamble 1101 are shown. Given a current threshold level of 79% (which corresponds to a correlation value of 76 because the maximum correlator value is only 96), the CD1 signal 1103 goes active for those correlation values that exceed 76. At the time of the first active CD1, the LONBSY signal 1106 is set. The LONBSY signal 1106 indicates that the channel is busy and is used to prevent the transmitter from transmitting. When the second level of qualification confirms the presence of carrier, the CD2 signal 1104 goes active. The transceiver then anticipates decoding a word sync signal. When the word sync signal is decoded, the RXEN signal 1105 goes active, at which time the transceiver starts decoding data.

FIG. 12 shows a circuit diagram for setting the adaptive threshold. The 7-bit counter 1201 is used to time the interval over which the number of false carrier detects is counted. Counter 1201 is the interval counter described above. The signal HRTBEAT provides a period of 980.4 microseconds to be used for counting. Interval counter 1201 counts (128–26)*the period of HRTBEAT=102*980.4 microseconds= 100 milliseconds. The interval counter counts only when CD2 and TCDOFF are both inactive. An active CD2 signal indicates that another node is currently transmitting. An active TCDOFF signal indicates that this transceiver is currently transmitting. In both cases, the interval counter is temporarily disabled.

The 3-bit counter 1202 is used to count the number of false carrier detects that occur during each 100 millisecond interval. When the CD1 signal goes active, it is not known whether it is a false carrier detect or the first carrier detect of a valid packet. When the signal CD1 goes active, the signal LONBSY is set and the process of confirming the presence of carrier begins. If the presence of carrier is confirmed, the signal SET_CD2 goes active and the signal CD2 is set. The operation of the false carrier detect counter 1202 is controlled in part by the signals LONBSY and SET_CD2.

The terminal count (TC) of interval counter 1201 resets the false carrier detect counter 1202. Thereby, at the beginning of each interval, the false carrier detect counter 1202 is reset. The false carrier detect counter 1202 is incremented by one each time LONBSY is set, which is indicated by the signal LBPLSE. If SET_CD2 goes active, the false carrier detect counter 1202 is decremented by one. Thus, upon reception of a valid packet, the net result of one increment and one decrement is no contribution to the false carrier detect count. On the other hand, if LONBSY was set due to a false carrier detect, then SET_CD2 does not go active, and one false carrier detect is counted. In this way, counter 1202 maintains a count of false carrier detects for each 100 millisecond interval. The counter is disabled from incrementing when it is already at its terminal count of 7 and is disabled from decrementing when it is already at a count of zero. Counter 1202 may also be incremented by one when the signal CD2BAIL is asserted, the reason for which will be described later.

Decoder 1203 decodes the number of false carrier detects counted by counter 1202 to determine whether the current threshold should be incremented or decremented by one. The false carrier detect (FCD) decoder 1203 generates the appropriate DEC_THR or INC_THR signal to decrement or increment, respectively, the current threshold maintained by the 3-bit counter 1204. The threshold may be incremented or decremented when the interval counter expires, which causes the signal UPD_THR to go active. In the currently preferred embodiment, the threshold is decremented by one if the number of false carrier detects counted in a 100 millisecond interval is exactly zero. The number of false carrier detects in a 100 millisecond interval required to increment the threshold is programmable. The configuration bit FCDTHR from the cell determines whether the threshold is incremented by one if the number of false carrier detects in a 100 millisecond interval is greater than or equal to 6 or 3, as shown in Table 1.

TABLE 1

| Configuration bits from the cell FCDTHR | Carrier detect threshold operation |
| --- | --- |
| 0 | Increment carrier detect threshold if FCD count is ≧6 at end of 100 ms interval |
| 1 | Increment carrier detect threshold if FCD count is ≧3 at end of 100 ms interval |

The generation of the carrier detect threshold is also controlled by three additional configuration bits CORRTH [2:0] from the cell. The configuration bits CORRTH[2:0] select one of two adaptive modes or one of six fixed thresholds, as shown in Table 2.

TABLE 2

| Configuration bits from the cell CORRTH[2:0] | Carrier detect threshold operation |
| --- | --- |
| 000 | Adaptive: wide range from 67%–88% (in 3% steps) |
| 001 | Adaptive: narrow range from 70%–85% (in 3% steps) |
| 010 | Fixed 67% |
| 011 | Fixed 70% |
| 000 | Fixed 76% |
| 001 | Fixed 79% |
| 010 | Fixed 85% |
| 111 | Fixed 88% |

If the configuration bits CORRTH[2:0] are set to 000 (binary) or 001 (binary), the carrier detect threshold is controlled by the adaptive threshold value maintained by counter 1204. If the configuration bits CORRTH[2:0] are set to 010 through 111 (binary), the carrier detect threshold is a fixed threshold controlled by the cell override block 1208.

The carrier detect threshold CDTHR[2:0] can take on eight possible values, each representing a different correlation percentage. Table 3, below, shows the eight possible percentage correlation thresholds and the corresponding value of CDTHR[2:0].

TABLE 3

| | | % correlation threshold | CDTHR[2:0] value (binary) |
| --- | --- | --- | --- |
| Wide range | Narrow range | 67% | 000 |
| | | 70% | 001 |
| | | 73% | 010 |
| | | 76% | 011 |
| | | 79% | 100 |
| | | 82% | 101 |
| | | 85% | 110 |
| | | 88% | 111 |

For the adaptive:wide range mode, the threshold may take on any of eight possible values. For the adaptive:narrow range mode, the threshold may take on any of six possible values. Therefore, when adapting the threshold, the minimum and maximum thresholds are as follows:

| | min thresh (decimal) | max thresh (decimal) |
| --- | --- | --- |
| Narrow range | 1 | 6 |
| Wide range | 0 | 7 |

The threshold decoder block 1205, in conjunction with AND gates or 1207, is used to disable the decrement control or increment control, respectively, of the threshold counter 1204 if the threshold has already reached its minimum value or maximum value, respectively.

The following description focuses on the generation of the CD2 signal, which confirms the presence of carrier. Referring to FIG. 13, timing diagrams of the DIBITFCE, CD1, CD2, and CD2HO signals are shown. In the currently preferred embodiment, the CD2 signal goes active whenever two non-overlapping 3-dibit correlations each cause CD1 to go active plus either one or two additional CD1 pulses are detected. The additional CD1 pulses can be from 3-dibit correlations which are either overlapping or non-overlapping. A configuration bit CD2DEF from the cell determines whether one or two additional CD1 pulses is required. When CD2DEF is set to zero, two CD1 pulses are required. This configuration is illustrated in FIG. 13. The DIBITFCE signal 1301 is used to mark each dibit time interval. As discussed above, a new correlation value is generated each dibit time period, and each correlation value represents a correlation for the previous three dibits.

Given a CD1 signal 1302 having a first CD1 pulse 1305, it can be seen that the next two CD1 pulses 1306–1307 are a result of correlations which overlap the correlation which caused the first CD1 pulse 1305. Pulse 1308 is the second CD1 pulse due to a non-overlapping correlation. Pulses 1309 and 1310 are the two additional CD1 pulses, which cause the CD2 signal 1303 to go active. The CD2HO signal 1304 is used by the CD2 detect circuit to ignore the overlapping CD1 pulses 1306 and 1307.

In the currently preferred embodiment, the CD2 detection process is aborted and the LONBSY signal is reset if the CD2 signal is not activated within a ten dibit period after the generation of the first CD1 pulse. Furthermore, the CD2 detection process and the LONBSY signal can be reset by a "low correlation". A low correlation is defined to be a correlation value that is less than half of the current threshold. This condition is indicated by an UNCORR signal. A low correlation usually indicates that a packet is not being received (i.e., the initial CD1 pulses were false). Hence, the LONBSY signal was erroneously asserted and should be reset. However, it is possible that an impairment on the communication medium will cause a low correlation, even during a valid packet. In order to detect these cases and not reset LONBSY in the middle of packet reception, the occurrence of three consecutive CD1 pulses is considered a strong indication of a valid packet and the low correlation condition (UNCORR) is therefore ignored during the next three dibits. In other words, the UNCORR signal is disabled for three dibits following three CD1 pulses in a row.

In the currently preferred embodiment, word sync must be decoded within a 16-dibit period after the first CD1 pulse. If word sync is not decoded within this period, the packet reception process is aborted. This functions as a watchdog timer in case CD2 is falsely detected. This watchdog signal is named CD2BAIL. The CD2BAIL signal resets CD2, which effectively resets LONBSY. As seen earlier, the CD2BAIL signal also increments the false carrier detect count by one. When CD2 is set, the false carrier detect count is decremented by one because it is assumed that a valid packet is being received. However, if CD2BAIL is asserted, there was likely no valid packet, and the false carrier detect count should be re-incremented by one.

FIG. 14 shows a circuit diagram of the CD2 signal generator. The logic gates 1401–1402 and flip-flop 1403 are used to indicate the occurrence of a first CD1 pulse and the beginning of the CD2 detection process. Once the first CD1 pulse is detected, flip-flop 1404 generates a holdoff signal, which is used to ignore overlapping correlations. The holdoff period lasts for two dibits following the first CD1 pulse. Counter 1405 is a 2-bit counter that counts the number of CD1 pulses which occur after the hold-off period. A separate, 4-bit counter 1406 is used to time three events following the first CD1 pulse. First, counter 1406 times two dibits following the first CD1 pulse in order to reset the holdoff signal generated by flip-flop 1404. Second, counter 1406 generates the STALE signal which goes active ten dibits following the first CD1 pulse and aborts the CD2 detection process if CD2 is not yet active. Third, counter 1406 times sixteen dibits following the first CD1 pulse, in order to generate the CD2BAIL signal if word sync has not yet been detected. Flip-flop 1407 controls the CD2 signal.

FIG. 15 shows a circuit diagram of the CD1 and UNCORR signals generator. The 3-bit carrier detect threshold CDTHR[2:0] is mapped by threshold mapping block 1501 to a seven-bit quantity, representing the threshold value to which the correlation value is compared. For example, if the current carrier detect threshold is 79%, the seven-bit value is set to 76, since 76 is 79% of the maximum correlation value of 96. Comparator 1502 compares the 7-bit correlation value generated by the correlator to the current 7-bit threshold value. If the correlation exceeds the threshold, CD1 goes active. Because the correlation value is only valid when DIBITFCE is active, CD1 may go active only when DIBITFCE is active, which is implemented by AND gate 1503. In addition, AND gate 1504 allows the CD1 signal to be disabled under certain circumstances. In particular, the CD1 signal is gated off when the transceiver is transmitting and when certain noise tones which might falsely trigger carder detect are detected, as will be described in the next section.

The UNCORR signal is generated by the 7-bit comparator 1505. Comparator 1505 compares the correlation value generated by the correlator to half the current threshold value. The UNCORR signal is active if the correlation is less than half the threshold, subject to certain restrictions. Namely, the UNCORR signal is disabled for three dibits following three consecutive CD1 pulses. This function is implemented by counters 1506 and 1507. Counter 1506 is used to count three consecutive CD1 pulses, and counter 1507 is used to count three dibits following the three consecutive CD1 pulses. During these three dibits, the terminal count (tc) of counter 1507 is inactive, so AND gate 1508 disables the UNCORR signal. Again, because the correlation value is only valid when DIBITFCE is active, UNCORR may go active only when DIBITFCE is active, which is implemented by AND gate 1509.

Distinguishing Valid Transmissions From Interfering Tones

In some environments there may be interfering tones imposed on the communication channel. Switch-mode power supplies, for example, conduct interference back onto power distribution lines at their operating frequency and its harmonics. In the event that one of these interfering tones occurs at a frequency near the communication frequency it might be falsely interpreted as a valid transmission.

The correlation carrier detector of the present invention reduces the probability that interfering tones would be interpreted as valid signals since a carrier detect indication is only asserted for signals which fall in a very narrow range of frequencies. Only signals which are offset from the carrier frequency by the preamble pattern frequency result in a high level of correlation. Even allowing for carrier detect correlation thresholds as low as 67%, the two bands susceptible to false detection are less than 1 kHz wide, centered above and below the carrier frequency (offset from the carrier frequency by the preamble pattern rate).

Even though it would be a rare occurrence for an interfering tone to fall in a susceptible band, many communication applications cannot tolerate this type of limitation. For this reason, an additional means for distinguishing valid transmissions from interfering tones is implemented. In the currently preferred embodiment, a detector is implemented which can differentiate between a preamble modulated carrier and a tone offset from the carrier frequency by the preamble rate. This interfering tone detector function is best understood with reference to the following description and associated drawings.

FIG. 16A is a conceptual illustration of a BPSK modulator where a carrier is multiplied by a +1 or −1 binary data value.

FIG. 16B illustrates how a corresponding BPSK receiver unit demodulates the transmitted BPSK signal. Referring to FIG. 16B, the incoming BPSK data signal is multiplied by an In-phase (I) local oscillator signal and a Quadrature (Q) local oscillator signal to generate a XI signal and a XQ signal, respectively. Both the I and the Q local oscillator signals have the same nominal frequency as the carrier signal in the transmitter. However, the I local oscillator signal and the Q local oscillator signal are 90° apart in phase from each other. Each of the two multiplied signals (XI and XQ) are passed through a low pass filter to create an In-phase (I) data signal and a Quadrature (Q) data signal, respectively.

When the I and Q data signals are plotted on a graph (an IQ diagram), the I and Q data signals create a line that passes through the origin of the graph as indicated by line 1601. The two endpoints of the line represent the binary "0" and "1" data. The line on the IQ diagram is rotated about the origin depending on how the original carrier phase compares with the phases of the two local oscillators in the receiver. In the example of FIG. 16B, the phase of the BPSK data signal matches up exactly with the phase of the In-phase (I) local oscillator.

FIGS. 16C–J illustrate how the receiver's I and Q signals appear on an IQ diagram for several different phase relationships between the transmitted BPSK signal and the receiver's local oscillators. It should be apparent that the signal line on the IQ diagram can appear in an arbitrary rotation relative to the I axis.

An interfering tone which is offset from the carrier by the preamble pattern rate results in the plots of FIGS. 16K and 16L, when recovered through the same receiver. Note that relative phase relationship between the I and Q signals is different for reception of a valid transmission than for the case of an interfering tone. The interfering tone results in a fixed 90 degree IQ phase relationship due to the 90 degree offset between the local oscillators. The currently preferred embodiment of the present invention distinguishes valid transmissions from interfering tones by disabling the correlation carrier detector if the receiver's I and Q signals exhibit approximately a 90 degree phase relationship. In this way, interfering tones offset from the carrier frequency are not detected as valid transmissions. At the same time, transmissions consisting of a proper preamble-modulated carrier are detected as valid.

The following description refers to the currently preferred embodiment of the interfering tone detector. Other variations and embodiments falling within the scope of the present invention can be implemented. FIG. 17 shows a flowchart describing the steps for distinguishing interfering tones from packets. In step 1701, a determination is made as to whether the I or Q amplitude is larger, on average, over the last dibit. This step is performed by using the IGTQ32 signal generated by the correlator. If the I component is larger, the I channel is selected, step 1702. Conversely, if the Q component is larger, the Q channel is selected, step 1703. Next, a zero crossing is detected on the selected (i.e., larger) channel, step 1704. Upon detecting the zero crossing, the magnitude of the non-selected (i.e., smaller I or Q) channel is stored, step 1705. One half bit time later, step 1706, the current magnitude of the selected channel is compared against the previously stored magnitude of the non-selected channel. Note that this half bit time corresponds to a 90° phase shift at the dotting pattern frequency (i.e., at the frequency most likely to cause a false carrier detect).

Step 1707 determines whether the magnitudes of the above two measurements are within 3 dB of one another. A determination is made as to whether these two magnitudes are within 3 dB of each other for three out of three consecutive results, step 1709. Three consecutive results are used since random noise or impairment may occasionally cause a single magnitude pair of a valid packet preamble to resemble a 90° detection. Detection of three consecutive occurrences indicates a high probability of an interfering tone, and the CD1 circuit is disabled for the current and next dibit, step 1710. Otherwise, the received signal is designated as possibly being a valid packet, and the CD1 circuit is not disabled, step 1708. Note that if subsequent zero crossings occur on the selected channel prior to the end of the one half of a bit time interval, they are ignored until the half-bit-time counter expires. Note also that the triggering event for a pass through the comparison process is a zero crossing on the larger of the two channels. In the currently preferred embodiment, a priority encoder which encodes the signal to a logarithmic value with 3 dB of resolution is implemented to minimize the hardware. Comparisons are performed according to the encoded values described as follows: a 0–3 dB difference corresponds to an interfering tone; a 3–6 dB difference may correspond to an interfering tone or a valid packet; and a >6 dB difference corresponds to a valid packet. The region of uncertainty between 3 and 6 dB is due to the 3 dB resolution of the comparison logic.

FIG. 18 is a block diagram of one embodiment of the interfering tone detector of the present invention. The zero crossing detector 1801 detects zero crossings on the selected (i.e., the larger) I or Q channel. The magnitude of the signal corresponding to the opposite (i.e., the smaller) channel is selected by selector 1803 under the control of the zero crossing detector 1801. This magnitude is then encoded by priority encoder 1804 in increments of 3 decibels. The encoded magnitude is then temporarily stored in register 1805. A half-bit delay is marked by counter circuit 1802, after which the selector 1803 selects the larger signal. The magnitude corresponding to the first (i.e., the larger) channel after the half-bit delay is then compared by subtractor 1806 with the previously stored magnitude corresponding to the smaller channel stored in register 1805. If the difference in their magnitudes is within the pre-determined range, flip-flop 1807 is set and flip-flops 1808 and 1809 store the results of the previous two comparisons. Hence, if the subtractor 1806 indicates that the difference in magnitudes was within the pre-determined range for three consecutive bits, all three flip-flops 1807–1809 are set and AND gate 1810 outputs an active tone detect signal to indicate the presence of a tone on the transmission medium. NOR gate 1811 is used to disable register 1805 so that its memory is not disrupted by an additional zero crossing detection during the half-bit time delay. Flip-flop 1812 and OR gate 1813 stretch the tone detection signal by one dibit time interval so that for both the current and following dibits, carrier detection is disabled. Logic gate 1814 is used to disable the interfering tone detector for received signals above the fixed band in use energy threshold. When the band in use threshold is chosen to be greater than the highest expected noise level, any signal above this threshold is assumed to be a valid carrier signal, so the interfering tone detector is disabled.

Access Protocol

The following discussion pertains to a specific access protocol, CENELEC EN50065-1, set forth by the European Committee for Electrotechnical Standardization. However, it should be noted that the same principles described below (e.g., carrier detection, maximum time interval for transmission, etc.) can readily be adapted to a wide range of access protocols. Section 5 of CENELEC EN50065-1 stipulates in part that:

5.1 In order to allow several systems to operate on the same mains installation the following requirements apply for the band 125–140 kHz. All systems shall use the frequency 132.5 kHz to indicate that a transmission is in progress.

5.2 No transmitter or group of transmitters shall transmit continuously for a period exceeding 1 second and after each transmission shall not transmit again for at least 125 ms; a transmission is considered as a series of signals in which there is no gap greater than 80 ms without signal transmission.

5.3 Every device capable of transmitting shall be equipped with a signal detector which shall indicate when the band is in use; band in use is the condition when any signal of at least 80 dB(uV) rms anywhere in the frequency range 131.5 kHz to 133.5 kHz and having lasted for at least 4 ms is present at the device's main input terminations and across the conductors used by the device's own transmitter.

5.4 Every device capable of transmitting shall only transmit if its band in use detector has shown that the band has not been in use (as defined in subclause 5.3) for a period, randomly chosen on each occasion and uniformly distributed between 85 ms and 115 ms with at least seven possible values in that range.

In the currently preferred embodiment, the present invention utilizes two independent signal detection mechanisms. The first type of signal detection mechanism involves a correlation detector with an adaptive threshold. As described above, the correlation detector compares the measured correlation value of a received signal to an adaptive threshold value. The second type of signal detection mechanism used is that of an energy detector. The energy detector senses signals that exceed a fixed energy threshold, for example 80 dB (uV). An energy detector with a threshold of 80 dBuV (or lower) is required by the CENELEC EN50065-1 access protocol In order to detect the band-in-use condition described above. Use of both a correlation detector with an adaptive threshold and an energy-based detector is advantageous, as will be described below.

First, an energy-based detector cannot sense packets whose energy level is below the energy level of the noise on the line. In contrast, a correlation detector is capable of sensing packets whose energy level is well below the energy level of the noise. In either case, the threshold for signal detect must be set high enough so that noise does not frequently trip the detector. If noise trips the detector, noise is mistaken as carrier and the channel falsely appears to be busy. This prevents packets from being sent during those times and thus reduces throughput. In the case of the energy-based detector, the threshold must be set some amount above the energy level of the background noise. For the band-in-use indicator, the energy threshold is set to 80 dBuV. Lowering this threshold would in fact cause noise on the power line to trip the indicator. Thus, in order to receive packets below 80 dBuV, a different carrier detect mechanism is required. In the case of the correlation detector, the threshold is set relative to the level of correlation of the noise; since noise does not typically correlate to the reference waveform, the correlation detector can sense packets even in the presence of high noise levels. Furthermore, by using an adaptive correlation threshold, the preferred embodiment of the present invention adapts to the current noise conditions, which further improves receiver sensitivity.

Second, unlike the correlation detector, the energy-based detector senses carrier for all types of packets transmitted by various transceivers operating in the same frequency band. Because the dotting pattern of LONWorks'™ packets is unique, the correlator senses only LONWorks'™ packets. Hence, the energy-based detector must be used by the transceiver to effectively share the communication medium among different types of transceivers. As specified by the CENELEC EN50065-1 access protocol, if the energy-based detector indicates that the band is in use, the transceiver will not transmit. This reduces the occurrence of collisions, which increases throughput for all networks sharing the medium.

Third, since the correlation detector does discriminate LONWorks'™ packets from packets of other types of transceivers, the transceiver does not attempt to receive a foreign packet. This ensures that the transceiver does not miss a LONWorks'™ packet while falsely trying to decode a foreign packet.

Thus, by using both an energy-based detector and a correlation detector with an adaptive threshold, the preferred embodiment of the present invention dramatically improves both receiver performance and network throughput.

In the currently preferred embodiment, network throughput is maximized by allowing a group of nodes to make full and continual use of the one-second interval. This requires that each node have the ability to abort a transmission if the one-second interval expires while it is transmitting a packet. Furthermore, in the case of an aborted transmission, the currently preferred embodiment increases network reliability and reduces network response time by acting upon the specific knowledge that a transmission was aborted. In the case of an aborted transmission, the transceiver and cell (101 and 103, respectively, in FIG. 1) work together to ensure that the packet is retransmitted at the next available opportunity. As specified by the access protocol of CENELEC EN50065-1, the next available opportunity to transmit is after at least 125 milliseconds have elapsed.

Different types of message services may be used to communicate between cells in a network. One type is unacknowledged service, in which each message is sent one or more times, with no acknowledgment from the recipient that the message has been received. In this circumstance, an aborted transmission would normally result in a lost packet. However, in the currently preferred embodiment, the packet will be retransmitted automatically, which improves network reliability. Another type of message service is acknowledged service, in which each packet is followed by an acknowledgment from the recipient. Retransmission of an aborted packet would normally take place only after the initiating node determines that the acknowledgment was not received in the required time, which may delay retransmission by many hundreds of milliseconds. In the currently preferred embodiment, the packet will be retransmitted automatically, which improves network response time.

In summary, the currently preferred embodiment implements the following steps: 1) at the end of a one-second interval, if the transceiver is currently transmitting, it aborts the transmission, and 2) the transceiver informs the cell that the transmission has been aborted, and 3) using the knowledge that the transmission was aborted, the cell initiates retransmission without excess delay.

Thus, an apparatus and method for detecting a valid signal in a communications system is disclosed.

What is claimed is:

1. A method for detecting a valid message signal, said method comprising the steps of:

setting a threshold at an initial level for qualifying a received signal;

counting from a first count to a second count, said first count and said second count defining a time interval;

determining a number of false signals that were detected during said counting step;

pausing said counting step during reception of a data packet; and adjusting said threshold according to said number of false signals that were detected during said counting step.

2. The method of claim 1, further comprising the step of pausing said counting step during a transmission of a data packet.

3. The method of claim 1, further comprising the steps of:

generating a plurality of correlation values by correlating said received signal against a known wave form; and adjusting said number of false signals that were detected according to a result of a comparison between each of said correlation values against said threshold.

4. The method of claim 3 further comprising the step of resetting said second level of qualification upon detecting a low correlation.

5. The method of claim 4, wherein said low correlation corresponds to said correlation value being less than half of said threshold.

6. The method of claim 4 further comprising the step of disabling said resetting step if a number of consecutive signal detect pulses are generated by said first level of qualification.

7. The method of claim 3, wherein said second level of qualification on said received signal is comprised of the steps of:
generating signal detect pulses corresponding to cycles of a pattern of a preamble according to said first level of qualification; and
determining whether at least two signal detect pulses corresponding to two of said correlation values which are non-overlapping have occurred within a second time interval.

8. The method of claim 7 further comprising the steps of:
determining whether N additional signal detect pulses follow at least two signal detect pulses corresponding to two correlation values which are non-overlapping within said second time interval, wherein N is programmably pre-determined; and
indicating that said received signal is said valid message signal if N additional signal detects pulses follow said at least two signal detect pulses.

9. The method of claim 1 further comprising the step of:
setting a channel busy indicator if said received signal passes said first level of qualification.

10. The method of claim 9 further comprising the step of clearing said channel busy indicator if after a first specified time period following a first signal detect pulse by said first level of qualification, said second level of qualification does not indicate said valid message signal.

11. The method of claim 3 further comprising the step of resetting said second level of qualification upon detecting a low correlation.

12. The method of claim 11, wherein said low correlation corresponds to said correlation value being less than half of said threshold.

13. The method of claim 11 further comprising the step of disabling said resetting step if a number of consecutive signal detect pulses are generated by said first level of qualification.

14. The method of claim 1 further comprising the step of adjusting said number of false signals that were detected during said time interval if a word synchronization is not achieved following a second specified time period after detection of a first signal detect pulse generated by said first level of qualification.

15. The method of claim 1 further comprising the step of distinguishing interfering tones over said valid message signal.

16. The method of claim 15, wherein said step of distinguishing interfering tones is comprised of the steps of:
determining a larger signal and a smaller signal between an in-phase signal and a quadrature signal of said received signal;
detecting a zero crossing of said larger signal;
recording an amplitude of said smaller signal;
comparing said larger signal to the previously recorded amplitude of said smaller signal after a pre-determined period of time; and
generating an interfering tone signal indicating that said received signal is an interfering tone if said amplitude of said larger signal is within a pre-determined magnitude of said smaller signal.

17. The method of claim 1, wherein said first level of qualification and said second level of qualification are based on an energy of said received signal.

18. The method of claim 1, wherein said determining step is comprised of the steps of:
performing said first level of qualification on said received signal;
incrementing said number of false signals if said received signal passes said first level of qualification;
performing said second level of qualification on said received signal; and
decrementing said number of false signals if said received signal passes said second level of qualification.

19. The method of claim 18 further comprising the step of correlating said received signal against a known waveform to determine a correlation value, wherein said received signal passes said first level of qualification if said correlation value exceeds said threshold.

20. A method for detecting a valid message signal, said method comprising the steps of:
a) setting a threshold at an initial level for qualifying a received signal;
b) counting from a first count to a second count, said first count and said second count defining an interval of time;
c) determining a number of false signals that were detected during said counting step, wherein said determining step comprises the steps of:
i) performing a first level of qualification on said received signal;
ii) incrementing said number of false signals if said received signal passes said first level of qualification;
iii) performing a second level of qualification on said received signal;
iv) decrementing said number of false signals if said second level of qualification indicates that said received signal is said valid message signal;
d) pausing said counting step during reception of a data packet;
e) lowering said threshold if said number of false signals that were detected during said counting step is less than a first pre-determined number;
f) raising said threshold if said number of false signals that were detected during said counting step is greater than a second pre-determined number; and
g) detecting said valid message signal based on said first level of qualification and said second level of qualification.

21. The method of claim 20 further comprising the step of setting a channel busy indicator if said received signal passes said first level of qualification.

22. The method of claim 21 further comprising the steps of repeating said determining step N times and selecting the channel having larger components most of said N times.

23. A method for producing correlation values, said method comprising the steps of:
modulating a carrier message signal with a particular pattern;
providing at least one reference pattern;
demodulating said carrier message signal to generate a demodulated pattern having a phase relative to said at least one reference pattern;
correlating said demodulated pattern against said at least one reference pattern to generate coefficient values; and
combining said coefficient values to provide a peak correlation value, wherein said correlating and combining steps yield a correlation value substantially independent of said phase of said demodulated pattern.

24. The method of claim 23 further comprising the step of demodulating said carrier message signal by down-converting said carrier message signal into an in-phase channel and a quadrature channel.

25. The method of claim 24 further comprising the steps of:

performing said modulating, said demodulating, said correlating, and said combining steps in an in-phase channel and a quadrature phase channel;

combining said correlation values from said in-phase channel to form a total correlation value, wherein said total correlation value is substantially independent of pattern phase and carrier phase.

26. The method of claim 25 further comprising the steps of:

determining which of said in-phase channel and said quadrature channel has a larger recovered amplitude;

selecting said correlation value based upon the channel having said larger recovered amplitude.

27. The method of claim 26 further comprising the steps of repeating said determining step N times and selecting the channel having said larger recovered amplitude most of said N times.

28. The method of claim 24 further comprising the step of generating said correlation value for a first period, and wherein a second correlation value is found by combining the correlation values corresponding to at least two previous said first periods.

29. The method of claim 28 wherein the second correlation values are produced for each of said first period and wherein each of the second correlation values represents a correlation which overlaps at least one of the correlations of the previous said first period.

30. The method of claim 24 wherein said demodulated pattern is comprised of a single bit limited sinusoidal waveform.

31. The method of claim 24 wherein the signal in the in-phase and quadrature phase channels used to produce said correlation value is represented by at least three amplitude levels.

32. The method of claim 23 further comprising the steps of:

generating an I signal and a Q signal output from a quadrature down converter corresponding to a received signal;

generating a signal indicating the presence of an interfering tone by comparing a phase relationship between said I signal and said Q signal.

33. The method of claim 32 further comprising the steps of:

determining whether said I signal and said Q signal are such that an IQ plot of said I signal and said Q signal forms an approximate circle or an approximate ellipse;

generating said signal indicating the presence of said interfering tone if said IQ plot forms said approximate circle.

34. The method of claim 32, wherein said signal indicating said interfering tone is generated if said I signal is approximately 90° out of phase relative to said Q signal.

35. The method of claim 32 further comprising the steps of:

determining a larger signal and a smaller signal between an in-phase signal and a quadrature signal of said received signal;

detecting a zero crossing of said larger signal;

recording an amplitude of said smaller signal;

comparing said larger signal to the previously recorded amplitude of said smaller signal after a pre-determined period of time; and generating an interfering tone signal indicating that said received signal is said interfering tone if said amplitude of said larger signal is within a pre-determined magnitude of said smaller signal.

36. The method of claim 23 further comprising the step of generating said correlation value for a first period, wherein said correlation value is a combination of the correlation values corresponding to at least two previous first periods.

37. The method of claim 36 further comprising the step of resetting a second level of qualification upon detecting a low correlation.

38. The method of claim 37, wherein said low correlation corresponds to said correlation value being less than half of a threshold.

39. The method of claim 36 further comprising the step of disabling said resetting step if a number of consecutive signal detect pulses are generated by a first level of qualification.

40. The method of claim 39, further comprising the step of performing a second level of qualification on said received signal, said second level of qualification comprising the steps of:

generating signal detect pulses corresponding to each cycle of said pattern of a preamble according to said first level of qualification;

determining whether at least two non-overlapping signal detect pulses followed by at least two additional signal detect pulses have occurred within a second time interval;

indicating that said received signal is a valid message signal if at least two non-overlapping signal detect pulses followed by at least two additional signal detect pulses.

41. The method of claim 23 further comprising the steps of:

setting a threshold at an initial level for qualifying a received signal;

counting from a first count to a second count, said first count and said second count corresponding to an interval of time;

determining a number of false signals that were detected during said counting step;

pausing said counting step during reception of a data packet;

adjusting said threshold according to said number of false signals that were detected during said counting step.

42. The method of claim 41 wherein the step of adjusting said number of false signals that were detected during said interval occurs if a word synchronization is not achieved following a second specified time period after detection of a first signal detect pulse generated by an initial qualification of the received signal.

43. The method of claim 23 wherein the demodulated patterns are represented by at least three amplitude levels.

44. The method of claim 23, wherein said demodulated carrier message signal is single bit limited.

45. The method of claim 44, wherein said carrier message signal is comprised of a preamble having a single bit limited sinusoidal pattern.

46. The method of claim 45 wherein said reference patterns are comprised of a single bit limited cosine wave and a single bit limited sine wave.

47. The method of claim 23, wherein said correlation method is used for carrier detect.

48. The method of claim 23, wherein a valid carrier message signal is comprised of a single bit limited sinusoidal pattern.

49. The method of claim 23, wherein said carrier signal is transmitted over a power line.

50. A transceiver for qualifying a valid message signal received from a transmission source, the transceiver comprising:

a first detector for qualifying the valid message signal by comparing a strength of a received signal to a strength threshold, wherein said received signal is indicated as being valid if said strength of said received signal exceeds said strength threshold; and a second detector for qualifying said valid message signal based on a correlation between said valid message signal and at least one reference pattern, wherein said first detector and said second detector operate in parallel.

51. The transceiver of claim 50, wherein said second detector distinguishes between message packets transmitted from different types of transceivers.

52. The transceiver of claim 50, wherein operation of said first detector is not dependent on operation of said second detector.

53. The transceiver of claim 50, wherein said second detector includes an adaptive threshold circuit.

54. A data communications network comprising:

a plurality of nodes for transmitting and receiving a plurality of message packets;

means for aborting a transmission of one of said message packets if a transmission by at least one of said nodes exceeds a predetermined time interval; and means for initiating a retransmission of said one of said message packets in response to a signal generated by said at least one nodes indicating that said transmission had been previously aborted.

55. A method for distinguishing a valid data signal from a false tone, said method comprising the steps of:

generating an I signal and a Q signal output from a quadrature down converter, said I signal and said Q signal output corresponding to a received signal, said quadrature down converter having an I channel and a Q channel 90° out of phase with respect to said I channel; and generating a signal indicating the presence of an interfering tone by comparing a phase relationship between said I signal and said Q signal.

56. The method of claim 55 further comprising the steps of:

determining whether said I signal and said Q signal are such that an IQ plot of the phase relationship between said I signal and said Q signal forms an approximate circle or an approximate ellipse;

generating said signal indicating said presence of said interfering tone if said IQ plot forms said approximate circle.

57. The method of claim 55, wherein said signal indicating said presence of said interfering tone is generated if said I signal is approximately 90° out of phase relative to said Q signal.

58. The method of claim 55 further comprising the steps of:

determining a larger signal and a smaller signal between an in-phase signal and a quadrature signal of said received signal;

detecting a zero crossing of said larger signal;

recording an amplitude of said smaller signal;

comparing said larger signal to the previously recorded amplitude of said smaller signal after a pre-determined period of time; and generating an interfering tone signal indicating that said received signal is said interfering tone if said amplitude of said larger signal is within a pre-determined magnitude of said smaller signal.

59. A method for operating a transceiver which transmits and receives message packets comprising the steps of:

aborting a transmission by at least one of a plurality of nodes if said transmission exceeds a pre-determined time interval; and initiating a retransmission in response to a signal generated within said at least one of said plurality of nodes indicating that said transmission had been previously aborted.

60. A method according to claim 1, further comprising the steps of:

performing a first qualification of said received signal;

performing a second qualification of said received signal; and detecting said valid message signal based on both said first qualification and said second qualification.

61. A method according to claim 60, wherein said second qualification is based on a criterion different from that of said first qualification.

62. A method according to claim 60, wherein said first qualification has a first decision time for qualifying said received signal, wherein said second qualification has a second decision time for qualifying said received signal longer than said first decision time, such that said second qualification is more accurate than said first qualification.

63. A method according to claim 20, wherein said second level of qualification is based on criteria different than that of said first level of qualification.

64. A method according to claim 20, wherein said second level of qualification has a decision time longer than that of said first level of qualification, such that said second level of qualification is more accurate than said first level of qualification.

65. A method according to claim 20, wherein said step of incrementing said number of false signals comprises the step of incrementing said number of false signals if said received signal passes said first level of qualification.

* * * * *

UNITED STATES PATENT AND TRADEMARK OFFICE
CERTIFICATE OF CORRECTION

PATENT NO. : 5,553,081
DATED : September 3, 1996
INVENTOR(S) : Downey et al.

It is certified that error appears in the above-identified patent and that said Letters Patent is hereby corrected as shown below:

In column 4 at line 67 delete "mount" and insert --amount--

In column 5 at line 64 delete "blankets" and insert --blankers--

In column 5 at line 67 delete "blankets" and insert --blankers--

In column 5 at line 64 delete "Blankets" and insert --Blankers--

In column 7 at line 66 delete "transit" and insert --transmit--

In column 17 at line 58 delete "carder" and insert --carrier--

In column 22 at line 29 delete "rime" and insert --time--

Signed and Sealed this

Twenty-first Day of October 1997

BRUCE LEHMAN
*Commissioner of Patents and Trademarks*

*Attest:*

*Attesting Officer*